(12) United States Patent
Tsurumi et al.

(10) Patent No.: US 11,469,921 B2
(45) Date of Patent: *Oct. 11, 2022

(54) SECURITY DEVICE, NETWORK SYSTEM, AND FRAUD DETECTION METHOD

(71) Applicant: PANASONIC INTELLECTUAL PROPERTY CORPORATION OF AMERICA, Torrance, CA (US)

(72) Inventors: Junichi Tsurumi, Osaka (JP); Yoshihiro Ujiie, Osaka (JP); Toshihisa Nakano, Osaka (JP); Hideki Matsushima, Tokyo (JP); Yuji Unagami, Osaka (JP)

(73) Assignee: PANASONIC INTELLECTUAL PROPERTY CORPORATION OF AMERICA, Torrance, CA (US)

(*) Notice: Subject to any disclaimer, the term of this patent is extended or adjusted under 35 U.S.C. 154(b) by 458 days.

This patent is subject to a terminal disclaimer.

(21) Appl. No.: 16/798,530

(22) Filed: Feb. 24, 2020

(65) Prior Publication Data
US 2020/0195472 A1  Jun. 18, 2020

Related U.S. Application Data

(63) Continuation of application No. 16/002,006, filed on Jun. 7, 2018, now Pat. No. 10,623,205, which is a
(Continued)

(30) Foreign Application Priority Data

Sep. 14, 2016  (JP) .............................. JP2016-179736

(51) Int. Cl.
| H04L 12/46 | (2006.01) |
| H04L 12/40 | (2006.01) |
| H04W 4/40 | (2018.01) |
| H04L 9/40 | (2022.01) |

(Continued)

(52) U.S. Cl.
CPC ............ H04L 12/46 (2013.01); B60R 16/023 (2013.01); B60R 25/00 (2013.01); G06F 11/30 (2013.01);
(Continued)

(58) Field of Classification Search
CPC ..... H04L 12/46; H04L 12/40; H04L 12/4625; H04L 63/0281; H04W 4/40; B60R 16/023; B60R 25/00; G06F 11/30
See application file for complete search history.

(56) References Cited

U.S. PATENT DOCUMENTS

2001/0003440 A1  6/2001  Wilhelm
2013/0317692 A1  11/2013  Iga
(Continued)

FOREIGN PATENT DOCUMENTS

| EP | 2892199 | 7/2015 |
| EP | 2892200 | 7/2015 |

(Continued)

OTHER PUBLICATIONS

International Search Report of PCT application No. PCT/JP2016/004518 dated Dec. 27, 2016.
(Continued)

*Primary Examiner* — Ronald B Abelson
(74) *Attorney, Agent, or Firm* — Greenblum & Bernstein, P.L.C.

(57) ABSTRACT

A security device connected to a plurality of networks in a vehicle is provided. The security device determines, with regard to a frame received from a first network, whether to transmit a determination request for the frame outside the vehicle. The security device transmits the determination request outside the vehicle in a case where it is determined to transmit the determination request outside the vehicle, transmits, before obtaining a determination result from out- (Continued)

side the vehicle in accordance with the determination request, the frame to a second network, and then obtains determination results from outside the vehicle in accordance with the determination request. The security device outputs presentation information in accordance with the determination result.

18 Claims, 20 Drawing Sheets

Related U.S. Application Data continuation of application No. PCT/JP2016/004518, filed on Oct. 7, 2016.

(60) Provisional application No. 62/266,831, filed on Dec. 14, 2015.

(51) Int. Cl.
*B60R 16/023* (2006.01)
*B60R 25/00* (2013.01)
*G06F 11/30* (2006.01)

(52) U.S. Cl.
CPC .......... *H04L 12/40* (2013.01); *H04L 12/4625* (2013.01); *H04L 63/0281* (2013.01); *H04L 63/1416* (2013.01); *H04W 4/40* (2018.02); *H04L 2012/40215* (2013.01); *H04L 2012/40273* (2013.01)

(56) References Cited

U.S. PATENT DOCUMENTS

| | | | |
|---|---|---|---|
| 2015/0113638 | A1 | 4/2015 | Valasek et al. |
| 2015/0191135 | A1 | 7/2015 | Ben Noon et al. |
| 2015/0191136 | A1 | 7/2015 | Ben Noon et al. |
| 2015/0191151 | A1 | 7/2015 | Ben Noon et al. |
| 2015/0195297 | A1 | 7/2015 | Ben Noon et al. |
| 2017/0026386 | A1 | 1/2017 | Unagami et al. |
| 2018/0027508 | A1* | 1/2018 | Tanaka ................ H04W 52/367 |
| 2018/0029539 | A1 | 2/2018 | Ben Noon et al. |

FOREIGN PATENT DOCUMENTS

| | | |
|---|---|---|
| EP | 3133774 | 2/2017 |
| JP | 2005-142848 A | 6/2005 |
| JP | 2012-166620 A | 9/2012 |
| JP | 2015-136107 | 7/2015 |
| WO | 2015/159520 | 10/2015 |

OTHER PUBLICATIONS

The Extended European Search Report from the European Patent Office (EPO) dated Dec. 10, 2018 for the related European Patent Application No. 16875087.5.

* cited by examiner

FIG. 3

| ID | DLC | DATA | CONTENTS |
|---|---|---|---|
| 1 | 2 | 10 20 | STEERING ANGLE (DEGREES) |
| 2 | 2 | 00 76 | SPEED (km/h) |
| 3 | 2 | 10 02 | WHITE LINE ANGLE (DEGREES) |
| 4 | 2 | 10 20 | AUTOMATIC STEERING ANGLE (DEGREES) |
| 5 | 1 | 01 | DISPLAY SWITCHING SIGNAL |

FIG. 9
| DATA FOR ID5 | CONTENTS DISPLAYED |
|---|---|
| 1 | NO-ABNORMALITY NOTIFICATION |
| 2 | WARNING NOTIFICATION |
| 3 | ATTACK-DETECTED NOTIFICATION |
| 4 | STOP ADVISORY |
FIG. 10
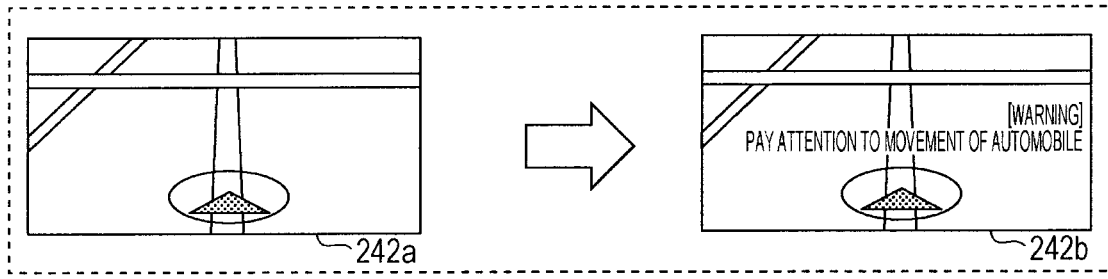
FIG. 11
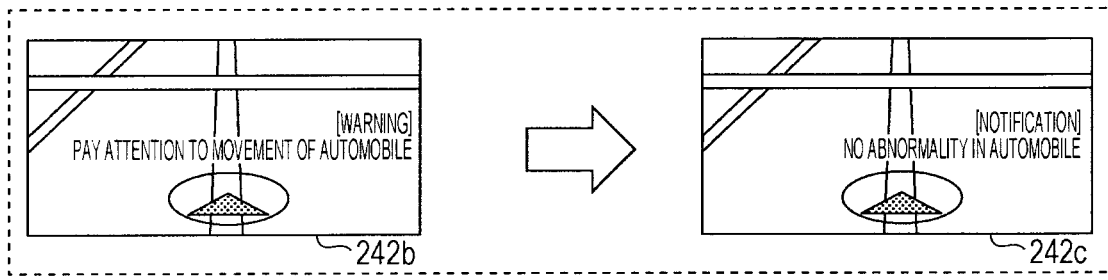
FIG. 12
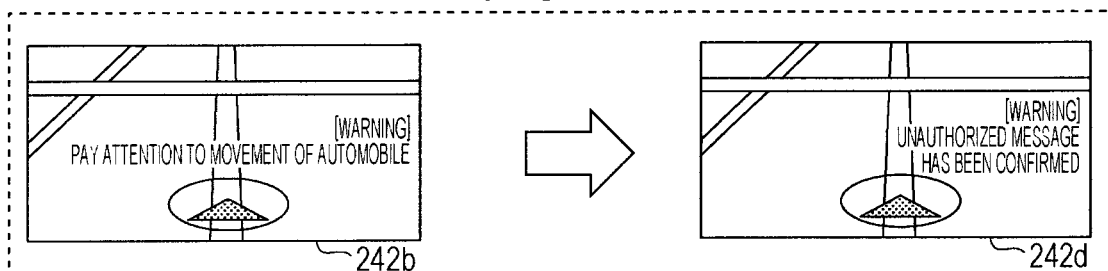
FIG. 13
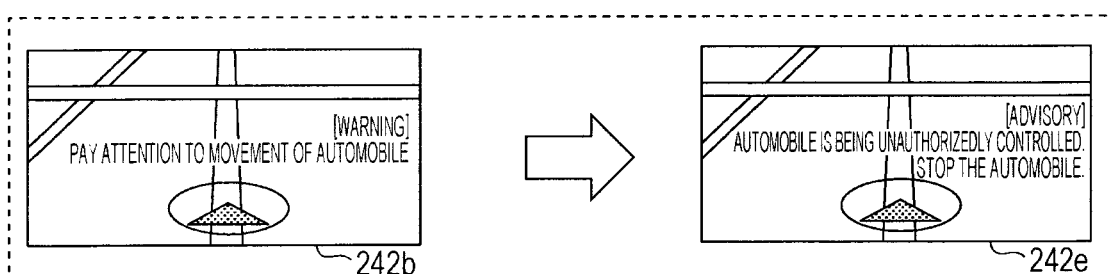

FIG. 15

RECEPTION ID LIST

| OBJECT BUS | RECEPTION ID |
|---|---|
| A | 1, 2, 3 |
| B | 4 |

FIG. 16

FORMAT RULES

| OBJECT ID | DLC | RANGE | CONTENT |
|---|---|---|---|
| 1 | 2 | −360 TO 360 | STEERING ANGLE (DEGREES) |
| 2 | 2 | 0 TO 255 | SPEED (km/h) |
| 3 | 2 | −180 TO 180 | WHITE LINE ANGLE (DEGREES) |
| 4 | 2 | −360 TO 360 | AUTOMATIC STEERING ANGLE (DEGREES) |

FIG. 17

JUDGMENT RULES

| OBJECT ID | THRESHOLD VALUE OF ABSOLUTE VALUE OF CHANGE AMOUNT | STIPULATED CYCLE FOR ID | CONTENT |
|---|---|---|---|
| 1 | 200 | 10 ms | STEERING ANGLE (DEGREES) |
| 2 | 100 | 10 ms | SPEED (km/h) |
| 3 | 10 | 10 ms | WHITE LINE ANGLE (DEGREES) |
| 4 | 200 | 10 ms | AUTOMATIC STEERING ANGLE (DEGREES) |

FIG. 18

WARNING RULES

| OBJECT ID | THRESHOLD VALUE OF ABSOLUTE VALUE OF CHANGE AMOUNT | CONTENT |
|---|---|---|
| 1 | 90 | STEERING ANGLE (DEGREES) |
| 2 | 50 | SPEED (km/h) |

FIG. 19

| NOTIFICATION RULES | | RESULTS OF DETERMINATION AT SERVER | | |
|---|---|---|---|---|
| | | UNDETERMINED | UNAUTHORIZED | NORMAL |
| STATE OF AUTOMOBILE | WARNING NECESSARY | 2 | 4 | 1 |
| | WARNING UNNECESSARY | − | 3 | × |

FIG. 20

TRANSFER RULES

| OBJECT ID | TRANSFER SOURCE BUS | TRANSFER DESTINATION BUS |
|---|---|---|
| 1 | A | B, C |
| 2 | A | B, C |
| 3 | A | B, C |
| 4 | B | A, C |
| 5 | – | C |

FIG. 21

| TRANSFER ID | VALUE | CONTENTS |
|---|---|---|
| 1 | 5 | STEERING ANGLE (DEGREES) |
| 2 | 40 | SPEED (km/h) |
| 3 | –8 | WHITE LINE ANGLE (DEGREES) |
| 4 | 5 | AUTOMATIC STEERING ANGLE (DEGREES) |

SECURITY DEVICE, NETWORK SYSTEM, AND FRAUD DETECTION METHOD

CROSS-REFERENCE TO RELATED APPLICATION

The present application is a continuation of U.S. patent application Ser. No. 16/002,006, filed Jun. 7, 2018, which is a continuation of International Patent Application No. PCT/JP2016/004518, filed Oct. 7, 2016, which claims the benefit of U.S. Provisional Patent Application No. 62/266,831, filed Dec. 14, 2015, and priority to Japanese Patent Application No. 2016-179736, filed Sep. 14, 2016. The disclosure of each of the above-identified applications, including the specification, drawings, and claims, is incorporated herein by reference in its entirety.

BACKGROUND

1. Technical Field

The present disclosure relates to technology for detecting an attack frame, which is a fraudulent frame transmitted in a network where an electronic control unit onboard a vehicle or the like is performing communication.

2. Description of the Related Art

In recent years, systems in automobiles have been come to be equipped with a great number of devices called ECUs (electronic control units). A network connecting these ECUs is referred to as an onboard network. There are many standards for onboard networks. A mainstream one of these onboard networks is a standard called Controller Area Network (CAN), which is stipulated by ISO 11898-1. In CAN, a communication path is a bus configured of two wires, and ECUs connected to the bus are called nodes. Each node connected to the bus transmits and receives messages called frames.

There are no identifiers indicating transmission targets or transmission sources in CAN. Transmitting nodes attach an ID called a message ID to each frame and transmit (i.e., send out signals onto the bus), and receiving nodes receive (i.e., read signals from the bus) only frames of predetermined IDs. The Carrier Sense Multiple Access/Collision Avoidance (CSMA/CA) system also is employed, where arbitration by message ID is performed when multiple nodes transmit at the same time, with frames having smaller message ID values being transmitted with priority.

As described above, CAN does not perform verification regarding whether or not a transmission source is legitimate, so an attacker (fraudulent node) can perform unauthorized control of the automobile by accessing the CAN bus and transmitting fraudulent frames (attack frames). There is a technology known as a technology to prevent such attacks, where in a case of a frame having been transmitted onto the CAN bus, determination is made regarding whether or not the frame has been unauthorizedly transmitted, and actions are taken such as issuing an alarm, blocking the fraudulent frame, and so forth (see Japanese Unexamined Patent Application Publication No. 2015-136107).

SUMMARY

However, there has been need for further improvement with the above-described background art.

In one general aspect, the techniques disclosed here feature a security device connected to one or multiple busses in a vehicle. The security device includes processing circuitry and storage including at least one set of instructions that, when executed by the processing circuitry, cause the processing circuitry to perform operations including receiving a frame from one or multiple of the busses, determining whether the received frame satisfies predetermined conditions, the predetermined conditions being conditions for distinguishing whether or not the received frame may be an attack frame, transmitting a determination request to an external device that exists outside of the vehicle, in a case where the predetermined conditions are determined to be satisfied, obtaining determination results transmitted from the external device in accordance to the determination request, outputting first presentation information in a case where determination is made, in the determining, that the predetermined conditions are satisfied, and outputting second presentation information in a case where the determination results are received in the obtaining.

According to the present disclosure, appropriate notification is made in a case where a frame suspect of being an attack frame has been transmitted, so the driver or the like of the vehicle can receive that notification and take appropriate measures.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 3 is a diagram illustrating a specific example of contents of a frame exchanged at a gateway;

FIG. 9 is a diagram illustrating an example of a display content table that a display content storage unit of the head unit ECU stores;

FIG. 10 is a diagram illustrating a display example of a warning notification at the head unit ECU;

FIG. 11 is a diagram illustrating a display example of a no-abnormality notification at the head unit ECU;

FIG. 12 is a diagram illustrating a display example of an attack detection notification at the head unit ECU;

FIG. 13 is a diagram illustrating a display example of a stopping advisory at the head unit ECU;

FIG. 15 is a diagram illustrating an example of a reception ID list relating to frame IDs that the gateway receives;

FIG. 16 is a diagram illustrating an example of frame format rules that the gateway uses to confirm whether or not a fraudulent frame;

FIG. 17 is a diagram illustrating an example of judgement rules that the gateway uses for judgement of whether or not an external determination request is necessary;

FIG. 18 is a diagram illustrating an example of warning rules that the gateway uses for judgement of whether or not warning is necessary;

FIG. 19 is a diagram illustrating an example of notification rules that the gateway uses to decide the content of notifications;

FIG. 20 is a diagram illustrating an example of transfer rules that the gateway uses;

FIG. 21 is a diagram illustrating an example of data values stored in a state storage unit of the gateway;

DETAILED DESCRIPTION

Figure 1:
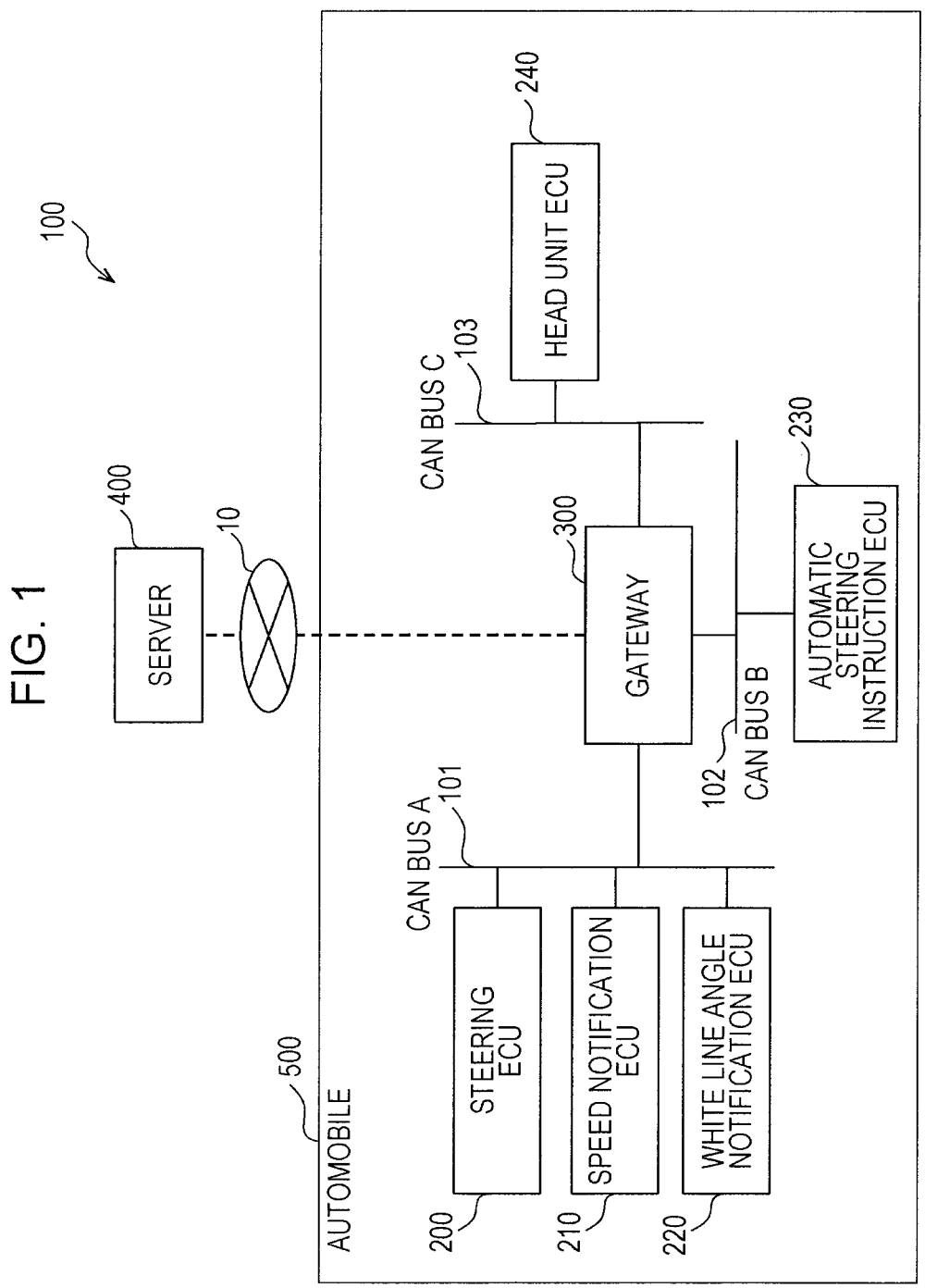
FIG. 1 is a diagram illustrating the overall configuration of a network system according to a first embodiment.

Underlying Knowledge Forming Basis of the Present Disclosure

In the technology Japanese Unexamined Patent Application Publication No. 2015-136107, in a case of a frame having been transmitted onto the CAN bus, determination is made regarding whether or not the frame has been unauthorizedly transmitted, and actions are taken such as issuing an alarm, blocking the fraudulent frame, and so forth. However, in a case where a frame transmitted to the bus of an onboard network is suspect to be an attack frame that an attacker has transmitted to unauthorizedly control the vehicle such as an automobile or the like, but cannot be determined to be an attack frame, it is not necessarily true that this frame should be blocked. Based on the above observations, the present inventors have reached the aspects of the present disclosure.

A security device according to an aspect of the present disclosure is a security device connected to one or multiple busses in a vehicle. The security device includes processing circuitry and storage including at least one set of instructions that, when executed by the processing circuitry, cause the processing circuitry to perform operations including receiving a frame from one or multiple of the busses, determining whether the received frame satisfies predetermined conditions, the predetermined conditions being conditions for distinguishing whether or not the received frame may be an attack frame, transmitting a determination request to an external device that exists outside of the vehicle, in a case where the predetermined conditions are determined to be satisfied, obtaining determination results transmitted from the external device in accordance to the determination request, outputting first presentation information in a case where determination is made, in the determining, that the predetermined conditions are satisfied, and outputting second presentation information in a case where the determination results are received in the obtaining. The security device may determine whether an attack frame or not by performing determination based on the predetermined conditions for distinguishing whether or not a frame may be an attack frame, and if determination is made as a result thereof that the predetermined conditions are satisfied, subsequently receiving determination results by the external device. A certain amount of time is required to transmit a determination request to the external device, cause the external device to perform determination, and receive determination results thereof. According to the security device having he above-described configuration, in a case where the predetermined conditions are satisfied, i.e., in a case where a frame suspect of being an attack frame is transmitted, appropriate notification is made by output of the first presentation information, and at the stage where determination results by the external device are obtained after a certain amount of time has elapsed, appropriate notification is performed by output of the second presentation information. Note that output of the presentation information is directed toward notification (information presentation, etc.) made to a driver of the vehicle, passengers, or other people, either directly or via a device having a user interface or the like. Accordingly, the driver or the like of the vehicle can receive the notification and take appropriate measures. For example, in a case where a frame suspect of being an attack frame is transmitted, once the attention of the driver has been called based on the first presentation information, the driver or the like can smoothly take measures when determination is made that the frame is an attack frame using the external device and notification is made based on the second presentation information. Thus, in a case where a frame suspect of being an attack frame is transmitted, adverse effects due to that frame or subsequent frames from that frame can be reduced.

For example, the vehicle may include multiple electronic control units that transmit and receive frames in accordance with Controller Area Network (CAN) protocol, via the one or multiple busses. Accordingly, in a case where an attack frame is transmitted in an onboard network conforming to CAN for exchanging frames among ECUs, appropriate notification can be promptly made to reduce adverse effects of the attack frame.

For example, the security device may be a gateway device connected to the one or multiple busses in the vehicle. Accordingly, the security device serving as a gateway device that transfers frames by connecting between multiple busses can perform appropriate notification in a case where an attack frame has been transmitted at any one of the busses.

For example, the operations may further include confirming whether or not the received frame falls under unauthorized conditions, transferring the received frame to another bus in a case where confirmation is made in the confirming that the frame does not fall under the unauthorized conditions, and not transferring the frame in a case where confirmation is made in the confirming that the frame falls under the unauthorized conditions, not determining that the predetermined conditions are satisfied in a case where confirmation is made in the confirming that the received frame falls under the unauthorized conditions, and outputting the first presentation information in a case where determination is made in the determining that the predetermined conditions are satisfied. Accordingly, in a case where a frame transmitted at one of the busses is confirmed to be a fraudulent frame (i.e., a frame not conforming to predetermined rules), The security device serving as a gateway device can suppress transfer among busses. Also, in a case where a frame transmitted at one of the busses is not determined to be a fraudulent frame, but is determined to be a frame that may be unauthorized, i.e., a frame suspect of being an attack frame, the security device transfers the frame, but outputs the first presentation information at the time of the determination, so more appropriate notification can be made to the driver or the like by this output. For example, the driver can quickly know that the vehicle may exhibit behavior different from that intended by the driver. The driver can thus drive while taking care regarding behavior of the vehicle.

For example, the operations may further include, in a case where determination is made in the determining that the predetermined conditions are satisfied, outputting the first presentation information when warning conditions are satisfied, and not outputting the first presentation information when warning conditions are not satisfied. Accordingly, even in a case where a frame suspect of being an attack frame is transmitted, whether or not there is a need to perform a warning can be distinguished from frame contents and the like. Thus, an arrangement can be made where output for notification is not performed in a case where adverse effects by the transmitted frame are smaller or the like, and confusion can be avoided by not giving the driver or the like unnecessary warnings.

For example, the operations may further include, in a case where the determination results are obtained from the external device in the obtaining, outputting information selected from multiple different information that differ from the first presentation information and that have been set beforehand, in accordance with whether or not the warning conditions have been satisfied, and the determination results thereof, as the second presentation information. Accordingly, appropriate information can be output in light of necessity to perform warnings at the time of obtaining determination results from the external device. Thus, appropriate notification can be made to the driver or the like based on determination results from the external device.

For example, the operations may further include distinguishing whether or not the warning conditions are satisfied based on content of one or multiple frames received in the receiving in the past. Accordingly, warning conditions can be set, such as being satisfied in a case where a frame that would make the behavior of the vehicle abnormal is currently received or has been received in the near past within a certain period, notification contents can be changed depending on whether the behavior of the vehicle is abnormal or not. That is to say, according to this configuration, in a state where abnormalities have subsided, a notification can be made to the driver or the like that does not excessively call attention, while in a state where abnormalities are continuing, a notification can be made to advise the driver or the like to stop the vehicle or the like, for example.

For example, the determination results from the external device may indicate one or the other of whether normal or not, and in a case where determination results have been obtained in the obtaining, outputting information selected from multiple different information that differ from the first presentation information and that have been set beforehand, in accordance with whether or not the determination results indicate normal, as the second presentation information. Accordingly, when determination results are obtained from the external device, second presentation information based on the determination results, that is different from the first presentation information, can be output. Display information output before and after determination results from the external device are obtained may change, so the display on a display or the like that performs display based on presentation information can be switched, and the driver or the like can be appropriately notified of information.

For example, the operations may further include transmitting the determination request to the external device, and receiving determination results transmitted from the external device in response to the determination request. Accordingly, the security device can communicate with the external device, so there is no more need to provide a communication device or the like in the vehicle, separately from the security device, for communication with the outside of the vehicle, and communication delay and the like can be reduced, for example.

For example, the operations may further include transmitting a frame including the first presentation information to one bus in the vehicle in a case where determination has been made in the determining that the predetermined conditions are satisfied, and transmitting a frame including the second presentation information to the one bus in a case where determination results have been obtained from the external device in the obtaining. Accordingly, even if the security device does not have a configuration to present (display, etc.) presentation information itself, the security device can realize notification by transmitting presentation information to an ECU connected by a bus and presenting the information via the ECU.

The predetermined conditions may include at least one of a condition relating to a reception interval between the received frame and a same-kind preceding frame, where the same-kind preceding frame has the same ID as the received frame and is received earlier in the receiving, a condition relating to a difference between data contents of the received frame and data contents of the same-kind preceding frame, and a condition relating to a correlativity between contents of a different-kind preceding frame and contents of the received frame, where the different-kind preceding frame has a different ID from the received frame and is received earlier in the receiving. Accordingly, the security device can appropriately determine whether or not a frame transmitted on a bus is an attack frame.

A network system according to an aspect of the present disclosure is a network system including a security device, an external device, a vehicle in which a communication device that communicates with the external device is installed, one or multiple busses, and multiple electronic control units that are installed in the vehicle and that exchange frames via the one or multiple busses. The securing device includes processing circuitry, and storage including at least one set of instructions that, when executed by the processing circuitry, cause the processing circuitry to perform operations including receiving a frame from one or multiple of the busses, determining whether the received frame satisfies predetermined conditions, the predetermined conditions being conditions for distinguishing whether or not the received frame may be an attack frame, transmitting a determination request to an external device that exists outside of the vehicle, in a case where the predetermined conditions are determined to be satisfied, obtaining determination results transmitted from the external device in accordance to the determination request, outputting first presentation information in a case where determination is made, in the determining, that the predetermined conditions are satisfied, and outputting second presentation information in a case where the determination results are received in the obtaining. Accordingly, in a case where a frame suspect of being an attack frame is transmitted on an onboard network configured of multiple ECUs, appropriate notification is made by output of the first presentation information, and at the stage where determination results by the external device that exists outside of the vehicle are obtained after a certain amount of time has elapsed, appropriate notification is performed by output of the second presentation information. Thus, in a case where a frame suspect of being an attack frame is transmitted, adverse effects due to that frame or subsequent frames from that frame can be reduced.

For example, the multiple electronic control units may include a first predetermined electronic control unit that has information presentation functions. The operations may further include transmitting a frame including the first presentation information to a bus to which the first electronic control unit is connected, in a case where determination has been made in the determining that the predetermined conditions are satisfied, and transmitting a frame including the second presentation information to the bus to which the first electronic control unit is connected, in a case where determination results have been obtained from the external device in the obtaining. The first electronic control unit may present the first presentation information in a case of having received a frame including the first presentation information, and present the second presentation information in a case of having received a frame including the second presentation information. Accordingly, in a case where a frame suspect of being an attack frame is transmitted on an onboard network, appropriate notification (presentation of information) is made by the predetermined electronic control unit (predetermined ECU) having information presentation functions.

For example, the vehicle may include an annunciation device that performs annunciation externally from the vehicle. The first presentation information may include control information to cause the annunciation device to perform annunciation, and the operations of the security device may further include transmitting the first presentation information to the annunciation device. The annunciation device may be a siren, emergency blinking display lights (hazard warning lights) or the lie, for example. Accordingly, in a case where a frame suspect of being an attack frame is transmitted on a bus of the vehicle, the attention of other vehicles and the like traveling in the vicinity of that vehicle can be called.

For example, the communication device may transmit log information, relating to the frames received by the reception unit of the security device, to the external device. The operations of the security device may further include transmitting the determination request to the external device via the communication device, and receiving determination results transmitted from the external device in response to the determination request, via the communication device. The external device may transmit, to the communication device, the results of having determined whether or not an attack frame is being transmitted at the vehicle, based on the log information, in a case of having received the determination request, as the determination results. Accordingly, the external device can accumulate log information relating to frames, and perform appropriate determination by analyzing the accumulated log information. Now, there are cases where the external device can determine what the vehicle cannot determine, regarding determination using information of frames as well. For example, in a case where the vehicle cannot accumulate a relatively great amount of log information, the external device may be able to collect and accumulate a great amount of log information regarding log information of multiple vehicles, as compared to a case where log information and so forth of vehicles other than that vehicle is not had, or the like.

For example, external device may transmit, to the communication device, the results of having observed operations of the vehicle from the outside of the vehicle and determined whether the operations of the vehicle are normal or not, as the determination results. Accordingly, determination of whether the operations of the vehicle are normal or not can be appropriately made, by the external device determining what the vehicle cannot determine. The vehicle can then appropriately determine whether or not an attack is being carried out, using the determination results from the external device. Accordingly, in a case where a frame suspect of being an attack frame has been transmitted at that vehicle, appropriate notification can be made by that vehicle.

For example, the external device may be another vehicle that is present in the vicinity of the vehicle in a case where determination has been made in the determining that the predetermined conditions are satisfied. Accordingly, in a case where a frame suspect of being an attack frame is transmitted at the vehicle, appropriate notification can be made by the vehicle performing a determination request to another vehicle in the vicinity and obtaining determination results.

A fraud detection method according to an aspect of the present disclosure is a fraud detection method used in an onboard network system where multiple electronic control units exchange frames via one or multiple busses. The method includes receiving a frame from the one or multiple busses, determining whether the received frame satisfies predetermined conditions, the predetermined conditions begin conditions for distinguishing whether or not the received frame may be an attack frame, presenting first presentation information in a case where determination is made in the determining that the predetermined conditions are satisfied, transmitting a determination request to an external device existing outside of the vehicle in a case where determination is made in the determining that predetermined conditions are satisfied, obtaining determination results transmitted from the external device in response to that determination request, and presenting second presentation information in a case where determination results from the external device have been obtained in the obtaining. Accordingly, in a case where a frame suspect of being an attack frame is transmitted to a bus in an onboard network system configured of multiple ECUs in a vehicle, appropriate notification is made by output of the first presentation information, and at the stage where determination results by the external device that exists outside of the vehicle are obtained after a certain amount of time has elapsed, appropriate notification is performed by output of the second presentation information. The driver or the like of the vehicle can recognize the first presentation information and second presentation information. Thus, in a case where a frame suspect of being an attack frame is transmitted, adverse effects due to that frame or subsequent frames from that frame can be reduced.

It should be noted that these general or specific embodiments may be implemented as a system, a method, an integrated circuit, a computer program, or a storage medium such as a computer-readable CD-ROM or the like, or any combination of a system, method, integrated circuit, computer program, and storage medium.

A network system including a gateway device serving as an example of a security device according to embodiments will be described below with reference to the drawings. Note that the embodiments each indicate a specific example of the present disclosure. That is to say, values, components, placement and connection arrangement of components, steps, orders of steps, and so forth in the following embodiments are only exemplary, and do not restrict the present disclosure. Components in the following embodiments which are not included in an independent Claim components which are optionally addable. The drawings are schematic drawings, and are not necessarily exact illustrations.

First Embodiment

Description will be made below regarding a gateway serving as a security device in an onboard network (onboard network system) where multiple electronic control units (ECU) onboard vehicle communicate via a bus, a network system including the vehicle and an external device, and a fraud detection method used in the network system. The fraud detection method is a method where transmission of an attack frame (including suspect frames) that is a fraudulent frame on a bus used for communication among the ECUS onboard the vehicle has been detected, and output is performed for notification in accordance with detection results. The security device (e.g., gateway device) in the onboard network onboard the vehicle, is a device that has at least functions to detect attacks related to a fraud detection method.

Here, description will be made regarding the network system, primarily with respect to the gateway device. The gateway device promptly notifies the driver in a case where determination has been made that a frame transmitted to the bus within the automobile may be a fraudulent frame (attack frame) and that this frame may cause the automobile to perform operations unintended by the driver. The gateway device further decides notification contents in accordance with behavior of the automobile when whether an attacked frame or not can be distinguished by receiving determination results from a server outside of the automobile, and notifies the driver.

1.1 Overall Configuration of Network System 100

FIG. 1 is a diagram illustrating the overall configuration of a network system 100 according to the present embodiment. The network system 100 includes an automobile 500 and a server 400, and a network 10 serving as a communication path between the automobile 500 and server 400. The network 10 may include the Internet or the like.

The automobile 500 has an onboard network configured including multiple electronic control units (ECU) that perform communication relating to frames, via an in-vehicle bus. The ECUs are connected to various types of devices such as in-vehicle control devices, sensors, actuators, user interface devise, and so forth. The ECUs on the onboard network in the automobile 500 perform communication following the CAN protocol. Frames in the CAN protocol include data frames, remote frames, overload frames, and error frames. Particular attention will be given to data frames in the description here. Note that data frames in CAN are stipulated including an ID field for storing an ID (message ID), a data length code (DLC) indicating data length, a data field storing data, and so forth.

The onboard network specifically has a CAN bus A 101, a CAN bus B 102, and a CAN bus C 103, as illustrated in FIG. 1 installed in the automobile 500. A steering ECU 200, a speed notification ECU 210, a pavement lane marking angle notification ECU 220, and a gateway 300 are connected to the CAN bus A 101. An automatic steering instruction ECU 230 and the gateway 300 are connected to the CAN bus B 102. A head unit ECU 240 and the gateway 300 are connected to the CAN bus C 103. Although the onboard network may include many more ECUs besides the ECUs illustrated in FIG. 1, Description will be made with attention given to the gateway 300, steering ECU 200, speed notification ECU 210, pavement lane marking angle notification ECU 220, automatic steering instruction ECU 230, and head unit ECU 240, for sake of convenience. The gateway 300 also is a type of ECU. ECUs are devices that include, for example, digital circuits such as processors (microprocessor), memory, and so forth, analog circuits, communication circuits, and the like. Examples of the memory include read-only memory (ROM), random access memory (RAM), and so forth, and can store control programs (computer programs serving as software) executed by the processor. An ECU can realize various types of functions by a processor operating in accordance with a control program (computer program), for example. Note that a computer program is configured of multiple combinations of command code indicating instructions to the processor, to achieve predetermined functions. The gateway 300 has a communication device (communication circuit, etc.) for communicating with the server 400 that is outside of the automobile 500.

The steering ECU 200, speed notification ECU 210, and pavement lane marking angle notification ECU 220 obtain the states of devices (sensors, etc.) to which they are respectively connected, and periodically transmit frames representing state (data frames) to the CAN bus (any one of CAN busses A through C). The gateway 300 transfers data frames among the busses. Upon receiving a frame relating to an angle of a pavement lane marking that the pavement lane marking angle notification ECU 220 has transmitted, the automatic steering instruction ECU 230 transmits a frame to the CAN bus B 102, for instructing the steering ECU 200 regarding the next steering angle, in order to make adjustment according to that frame so that the automobile 500 travels following the pavement lane marking.

The gateway (gateway device) 300 confirms the ID of a received frame, based on a reception ID list (list of message IDs) that it stores, and filters frames. The gateway 300 also has functions of detecting attacks, by monitoring frames flowing over the bus, and transmits log information extracted from received frames to the server 400. The gateway 300 moreover determines whether or not a frame that is suspect to have been unauthorizedly transmitted (i.e., a frame that is suspect of being an attack frame), based on whether or not the received frame satisfies judgment conditions relating to a reception cycle set for each ID, amount of change in data within the frame, and so forth, and requests (commissions) the server 400 to perform determination in a case of having determined that a frame is suspect of being an attack frame.

In a case where determination is made that the gateway 300 has received the frame suspect of being an attack frame from the CAN bus B (102), and that the automobile 500 may perform operations unintended by the driver as a result of transfer of that frame, such as the steering ECU 200 being controlled, for example, based on warning conditions decided beforehand, this frame is transferred to the CAN bus A 101 upon having instructed the head unit ECU 240 to give a warning (a display notifying the driver of the warning, etc.).

Figure 2:
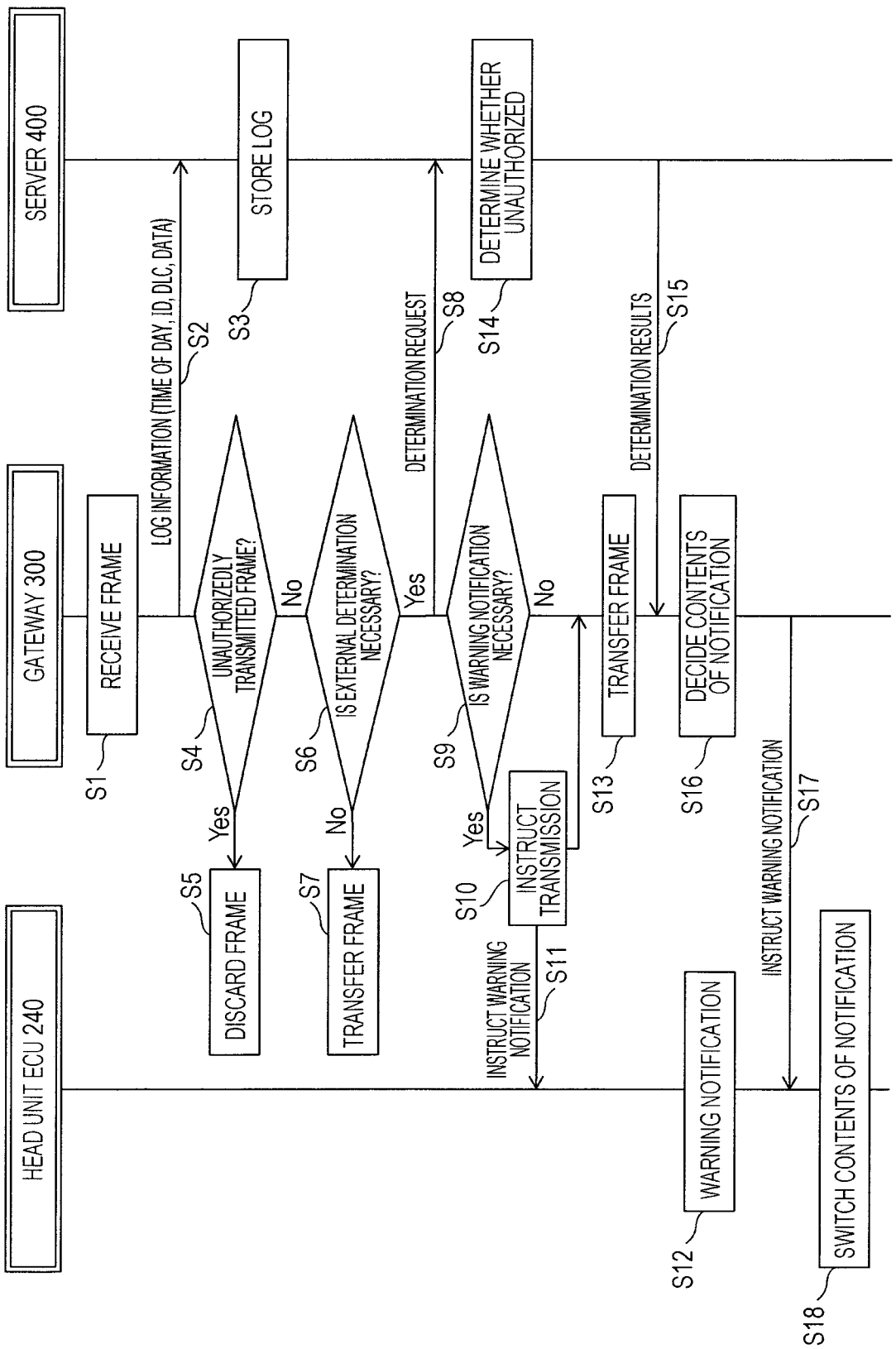
FIG. 2 is a diagram illustrating an operation example of the network system according to the first embodiment.

The server 400 that has received the determination request (determination commission) from the gateway 300 determines whether the frame regarding the determination request is normal or abnormal, based on reception cycle and so forth, using log information that has been received and accumulated so far, and returns determination results to the gateway 300. The gateway 300 decides content to be notified to the user, in accordance with the determination results from the server 400 and the current state of the automobile 500 (steering angle, speed of the automobile 500, and so forth), and instructs the head unit ECU 240 of the content. The head unit ECU 240 performs notification on a display or the like provided to the instrument panel or the like (switches display to notify the driver), upon having received the instruction from the gateway 300. FIG. 2 illustrates an example of operations of such a network system 100. Details of the operations will be described later.

1.2 ECUs

The configuration of each of the ECUs, and the contents of the frames that are generated, will be described here. Components that are the same among ECUs will be denoted by the same reference symbols, and description will be omitted as appropriate.

The steering ECU 200 periodically transmits frames of ID1 at a 10 ms cycle. Here, an ID that is 1 will be written as ID1, and IDs of 2, 3, 4, and 5 as ID2, ID3, ID4, and ID5, respectively. Note that the cycle of 10 ms is only an example. An optional value may be decided for transmission. The frame of ID1 includes data indicating the steering angle (the current angle of steering). Upon receiving a frame of ID4 transmitted from the automatic steering instruction ECU 230, the steering ECU 200 controls the steering angle in accordance with a steering instruction angle for the steering that the data in the frame indicates.

The speed notification ECU 210 periodically transmits frames of ID2 at 10 ms cycles. The frames of ID2 include data indicating the current speed of the automobile.

The pavement lane marking angle notification ECU 220 periodically transmits frames of ID3 at 10 ms cycles. The frames of ID3 include data indicating while line angle (i.e., the difference in angle between the direction of travel, which is the fore-aft direction of the body, and pavement lane markings).

The automatic steering instruction ECU 230 periodically transmits frames of ID4 at 10 ms cycles. The frames of ID4 include data indicating automatic steering angle (i.e., the next steering angle).

Upon receiving a frame of ID5 transmitted from the gateway 300, the head unit ECU 240 switches the content of display on a display provided to the instrument panel or the like for example, in accordance with the display content that the data within the frame indicates.

1.2.1 Frames Generated at the Respective ECUs

FIG. 3 is a diagram illustrating an example of frames (data frames) generated at the ECUs. The value of the DLC is decided beforehand for each ID. The content that the data in the data field indicates is decided beforehand for each ID. Specifications of this data and so forth are not stipulated in the CAN protocol, and are specifications dependent on the model of the automobile 500, the manufacturer (automaker), or the like, for example.

Now, the frame of ID1 indicates the current steering angle of the automobile 500, and the DLC is 2. Data is notated in hexadecimal in FIG. 3, with one digit of data representing a 4-bit value. The first digit of the data of the frame of ID1 represents whether the steering currently is directed toward the right or the left. 0 represents left, and 1 represents right. The remaining three digits of the data represents the steering angle in terms of 0 to 360 degrees, with the steering angle where the tires match the fore-aft direction of the vehicle being 0 degrees. The frame of ID2 indicates the current speed of the automobile 500, and the DLC is 2. The data indicates the current speed in two digits. The frame of ID3 indicates the pavement lane marking angle that is the angular difference between the direction of travel of the automobile 500 and the pavement lane marking direction on the pavement, and the DLC is 2. The data in the frame of ID3 is expressed in the same way as that in the frame of ID1. The frame of ID4 is a frame for automatic steering instruction (an instruction to control the steering automatically, indicating the automatic steering angle of the automobile 500, and the DLC is 2. The data in the frame of ID4 is expressed in the same way as that in the frame of ID1. The frame of ID5 indicates a No. (display switching signal) that instructs display content to be used for switching the display at the head unit ECU 240, and the DLC is 1. The data in the frame of ID 5 specifies the content of display using two digits. Specific display content (screen display) and Nos. specifying the display content will be described later with reference to FIGS. 9 through 13.

1.2.2 Steering ECU

Figure 4:
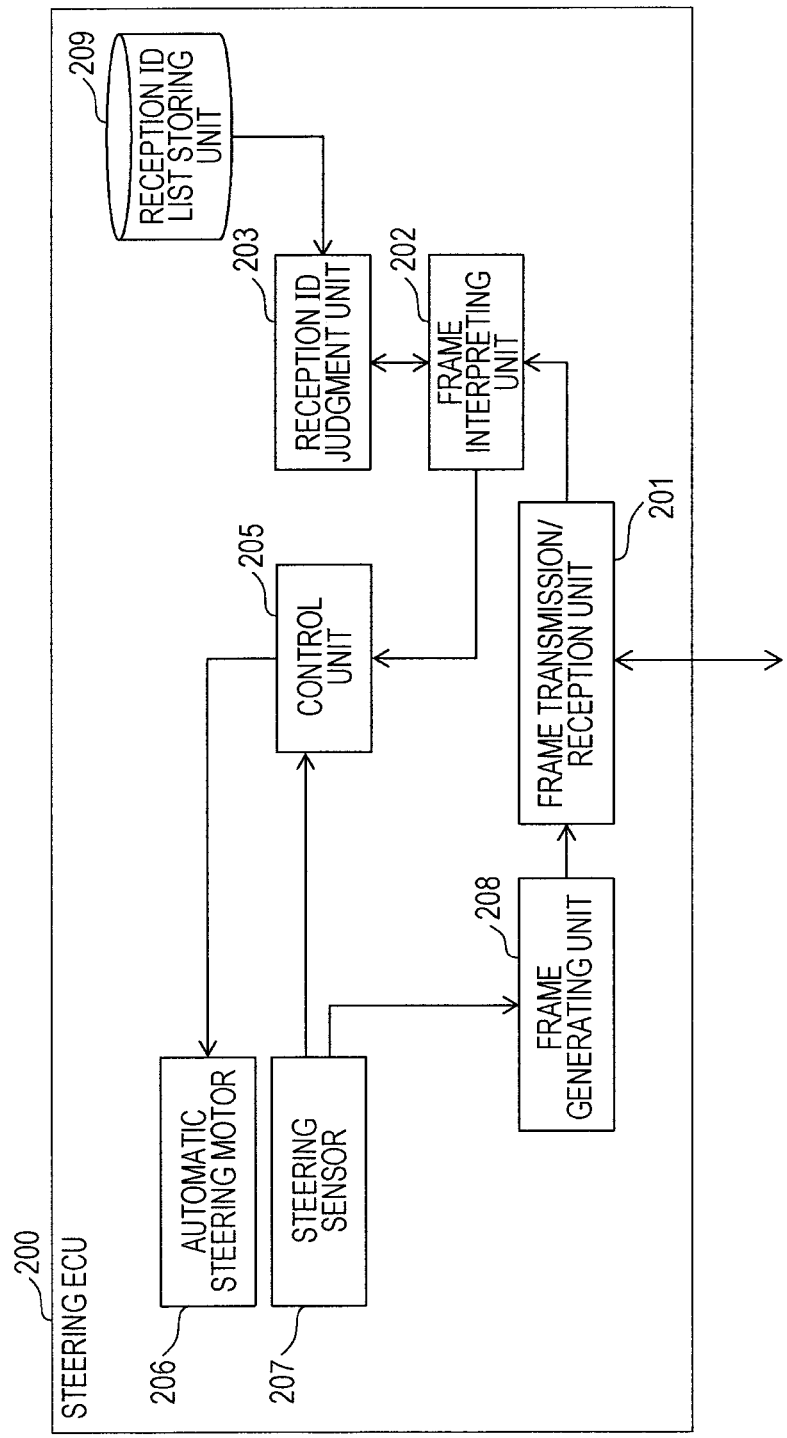
FIG. 4 is a configuration diagram of a steering ECU.

FIG. 4 is a configuration diagram of the steering ECU 200. As illustrated in FIG. 4, the steering ECU 200 is configured including a frame transmission/reception unit 201, a frame interpreting unit 202, a reception ID judgement unit 203, a reception ID list storing unit 209, a frame generating unit 208, a control unit 205, an automatic steering motor 206, and a steering sensor 207.

Upon receiving a frame from a CAN bus to which it is connected, the frame transmission/reception unit 201 sends the frame to the frame interpreting unit 202. Upon receiving a frame generated at the frame generating unit 208, the frame transmission/reception unit 201 transmits the received frame to the CAN bus to which it is connected.

The frame interpreting unit 202 extracts the ID, DLC, and data, from a frame received from the frame transmission/reception unit 201, with each of the ID, DLC, and data distinguished, and transmits the ID to the reception ID judgement unit 203. Upon having received results from the reception ID judgement unit 203 that the ID is an ID that should be received, the frame interpreting unit 202 transmits the ID, DLC, and data to the control unit 205, but upon receiving results that the ID is not an ID that should be received, discards the frame.

Upon receiving the ID from the frame interpreting unit 202, the reception ID judgement unit 203 judges whether or not the ID is an ID that should be received, based on a reception ID list stored in the reception ID list storing unit 209, and returns the results to the frame interpreting unit 202.

The reception ID list storing unit 209 stores a reception ID list used to judge whether or not an ID is an ID that the reception ID judgement unit 203 should receive. The steering ECU 200 stores a reception ID list that stores frames of ID4, indicating automatic steering angle.

If confirmation of the ID of the received frame indicates that the frame is a frame for automatic steering instruction (frame of ID4), the control unit 205 references the current steering angle obtained by the steering sensor 207, and controls the automatic steering motor 206. The automatic steering motor 206 operates the steering in accordance with instructions from the control unit 205.

The steering sensor 207 obtains the steering angle of the automobile 500 at a cycle of once every 10 ms, and transmits the steering angle to the control unit 205 and frame generating unit 208.

The frame generating unit 208 generates, every 10 ms, a frame of ID1 including data that indicates the steering angle of the automobile 500 transmitted from the steering sensor 207, and transmits this to the frame transmission/reception unit 201.

1.2.3 Speed Notification ECU

Figure 5:
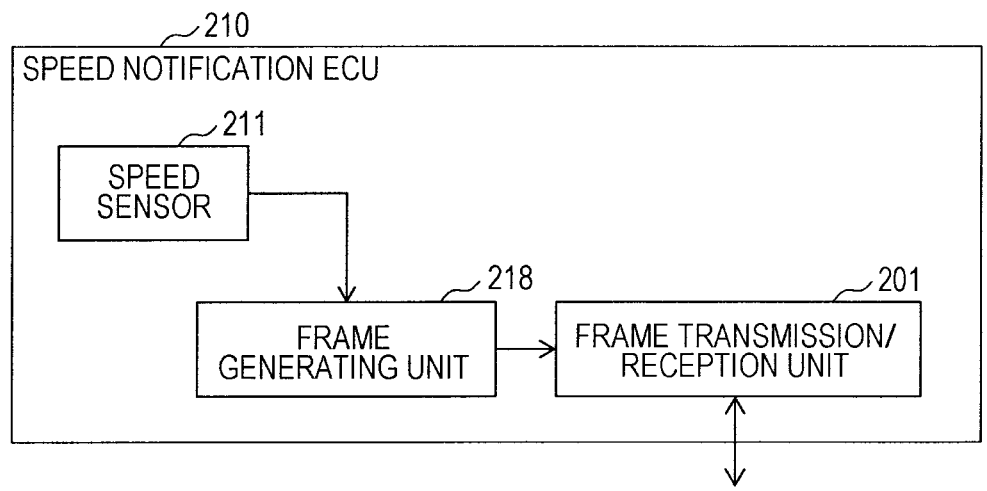
FIG. 5 is a configuration diagram of a speed notification ECU.

FIG. 5 is a configuration diagram of the speed notification ECU 210. The speed notification ECU 210 is configured including the frame transmission/reception unit 201, a frame generating unit 218, and a speed sensor 211, as illustrated in FIG. 5.

The speed sensor 211 transmits the speed of the automobile 500 to the frame generating unit 218, at a cycle of once every 10 ms. The frame generating unit 218 generates, every 10 ms, a frame of ID2 including data that indicates the speed of the automobile 500 transmitted from the speed sensor 211, and transmits this to the frame transmission/reception unit 201.

Upon having received the frame generated at the frame generating unit 218, the frame transmission/reception unit 201 transmits the received frame to the CAN bus to which it is connected.

1.2.4 Pavement Lane Marking Angle Notification ECU

Figure 6:
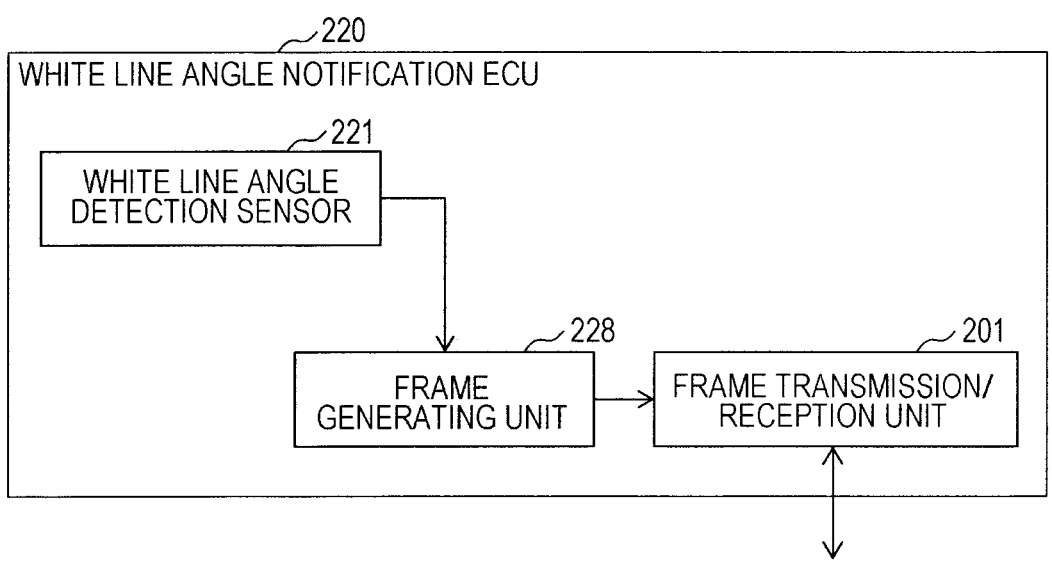
FIG. 6 is a configuration diagram of a pavement lane marking angle notification ECU.

FIG. 6 is a configuration diagram of the pavement lane marking angle notification ECU 220. The pavement lane marking angle notification ECU 220 is configured including the frame transmission/reception unit 201, a frame generating unit 228, and a pavement lane marking angle detection sensor 221, as illustrated in FIG. 6.

The pavement lane marking angle detection sensor 221 transmits the angular difference between the direction of travel, which is the fore-aft direction of the body of the automobile 500, and pavement lane markings on the pavement, to the frame generating unit 228 at a predetermined cycle. The frame generating unit 228 generates, every 10 ms, a frame of ID3 including data that indicates the angular difference between the automobile 500 and pavement lane markings, and transmits this to the frame transmission/reception unit 201.

Upon receiving the frame generated at the frame generating unit 228, the frame transmission/reception unit 201 transmits the received frame to the CAN bus to which it is connected.

1.2.5 Automatic Steering Instruction ECU

Figure 7:
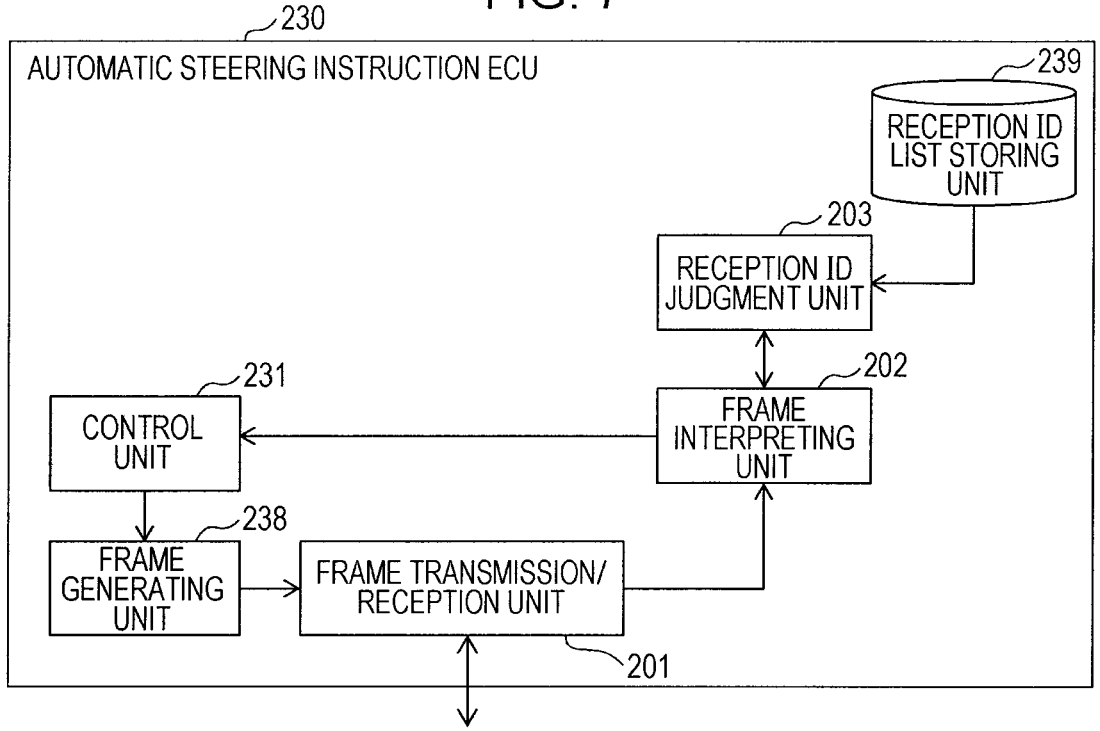
FIG. 7 is a configuration diagram of an automatic steering ECU.

FIG. 7 is a configuration diagram of the automatic steering instruction ECU 230. The automatic steering instruction ECU 230 is configured including the frame transmission/reception unit 201, the frame interpreting unit 202, the reception ID judgement unit 203, a reception ID list storing unit 239, a frame generating unit 238, and a control unit 231, as illustrated in FIG. 7.

The reception ID list storing unit 239 stores a reception ID list including ID1 and ID3, in order to judge to receive, at the reception ID judgement unit 203, frames of ID1 indicating the steering angle from the steering ECU 200 and frames of ID3 indicating the pavement lane marking angle from the pavement lane marking angle notification ECU 220.

The control unit 231 decides and instructs the next steering angle, based on the steering angle that the data of the frame of ID1 indicates, and the pavement lane marking angle indicated by the data of the frame of ID3 (angular difference between the direction of travel of the automobile 500 and the direction of pavement lane markings on the pavement), from a frame received from the frame interpreting unit 202. For example, in a case where the pavement lane marking angle (angular difference) is 10 degrees to the left, the next steering angle is decided to be 10 degrees to the left or the like, for example, and the frame generating unit 238 is caused to generate a frame indicating this decided angle.

The frame generating unit 238 generates, every 10 ms, a frame of ID4 including data that indicates the angle decided at the control unit 231 (automatic steering angle), and transmits this to the frame transmission/reception unit 201.

1.2.6 Head Unit ECU

The head unit ECU 240 includes functions of an automotive navigation system or the like for example, and performs various types of display on a display provided to the instrument panel or the like, thereby causing the driver to recognize information.

Figure 8:
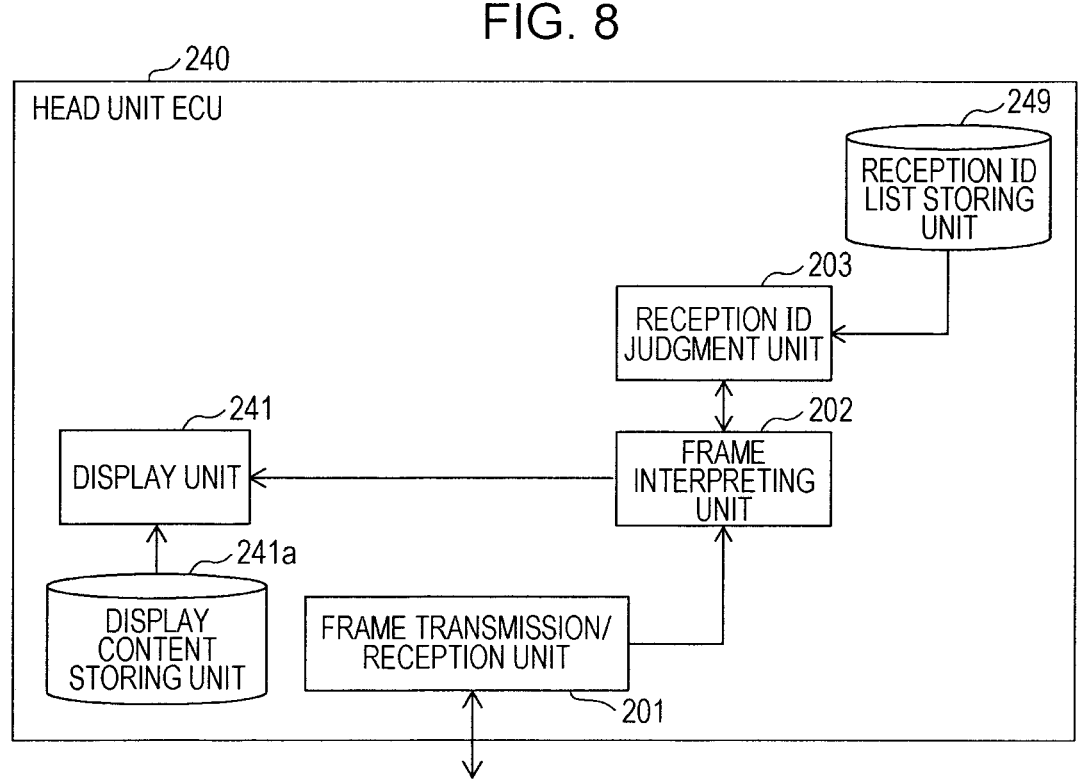
FIG. 8 is a configuration diagram of a head unit ECU.

FIG. 8 is a configuration diagram of the head unit ECU 240. The head unit ECU 240 is configured including the frame transmission/reception unit 201, the frame interpreting unit 202, the reception ID judgement unit 203, a reception ID list storing unit 249, a display unit 241, and a display content storing unit 241a, as illustrated in FIG. 8.

The reception ID list storing unit 249 stores a reception ID list including ID5, in order to judge to receive, at the reception ID judgement unit 203, frames of ID5 indicating signals to switch the display from the gateway 300. The display unit 241 has functions of performing various types of display on a display screen, an in a case where a frame of ID5 indicating a No. corresponding to display content (displays switching signal) from the gateway 300 is received at the frame transmission/reception unit 201, the display content is identified based on the display content table stored at the display content storing unit 241a, and the display of the display screen is switched. The display content storing unit 241a stores a display content table.

FIG. 9 is a diagram illustrating an example of the display content table that the display content storing unit 241a stores. The display content table correlates Nos. (display switching signals) indicated by data in the frame of ID5 received from the gateway 300, and display contents. This display content table enables the display unit 241 to perform display of display contents serving as a no-abnormality notification (a message to the effect that there has been no abnormality, etc.) on the display, in a case where the No. indicated by data in the received frame of ID5 is 1. In a case where the No. indicated by data in the received frame of ID5 is 2, the display unit 241 performs display of display contents serving as a warning notification (a message to take care regarding operations of the automobile 500 unintended by the driver, etc.). In a case where the No. indicated by data in the received frame of ID5 is 3, the display unit 241 performs display of display contents serving as an attack-detected notification (a message to the effect that transmission of an attack frame over the onboard network has been detected, etc.). In a case where the No. indicated by data in the received frame of ID5 is 4, the display unit 241 performs display of display contents serving as a stop advisory (a message advising the driver to stop the automobile 500, etc.).

Specific screen display examples by the display unit 241 described above will be described with reference to FIGS. 10 through 13. FIG. 10 illustrates a display example of a warning notification at the head unit ECU 240. A state will be assumed where the head unit ECU 240 is displaying a screen 242a, indicating the position of the automobile 500 on a road map using automotive navigation functions, on the display. When the head unit ECU 240 receives a frame of 105 including data of No. 2 in this state, the head unit ECU 240 displays a screen 242b relating to a warning notification on the display. The frame of ID5 including data of No. 2 is transmitted from the gateway 300 to the CAN bus C 103 when a frame that could cause the automobile 500 to perform operations unintended by the driver has been transferred among CAN busses.

FIG. 11 illustrates a display example of a no-abnormality notification at the head unit ECU 240. When the head unit ECU 240 displays the above-described screen 242b on the display, and thereafter receives a frame of 105 including data of No. 1, the head unit ECU 240 displays a screen 242c relating to the no-abnormality notification on the display. The frame of ID5 including data of No. 1 is transmitted from the gateway 300 to the CAN bus C 103 when having determined that no attack frame has been transmitted, based on determination results at the server 400.

FIG. 12 illustrates a display example of an attack-detected notification at the head unit ECU 240. When the head unit ECU 240 displays the above-described screen 242b on the display, and thereafter receives a frame of ID5 including data of No. 3, the head unit ECU 240 displays a screen 242d relating to the attack-detected notification on the display. The frame of ID5 including data of No. 3 is transmitted from the gateway 300 to the CAN bus C 103 when having determined that an attack frame has been transmitted, based on determination results at the server 400, and also having confirmed that no operations unintended by the driver are currently occurring in the automobile 500.

FIG. 13 illustrates a display example of a stop advisory at the head unit ECU 240. When the head unit ECU 240 displays the above-described screen 242b on the display, and thereafter receives a frame of ID5 including data of No. 4, the head unit ECU 240 displays a screen 242e relating to the stop advisory on the display. The frame of ID5 including data of No. 4 is transmitted from the gateway 300 to the CAN bus C 103 when having determined that an attack frame has been transmitted, based on determination results at the server 400, and also having confirmed that operations unintended by the driver are currently occurring in the automobile 500.

1.3 Gateway

Figure 14:
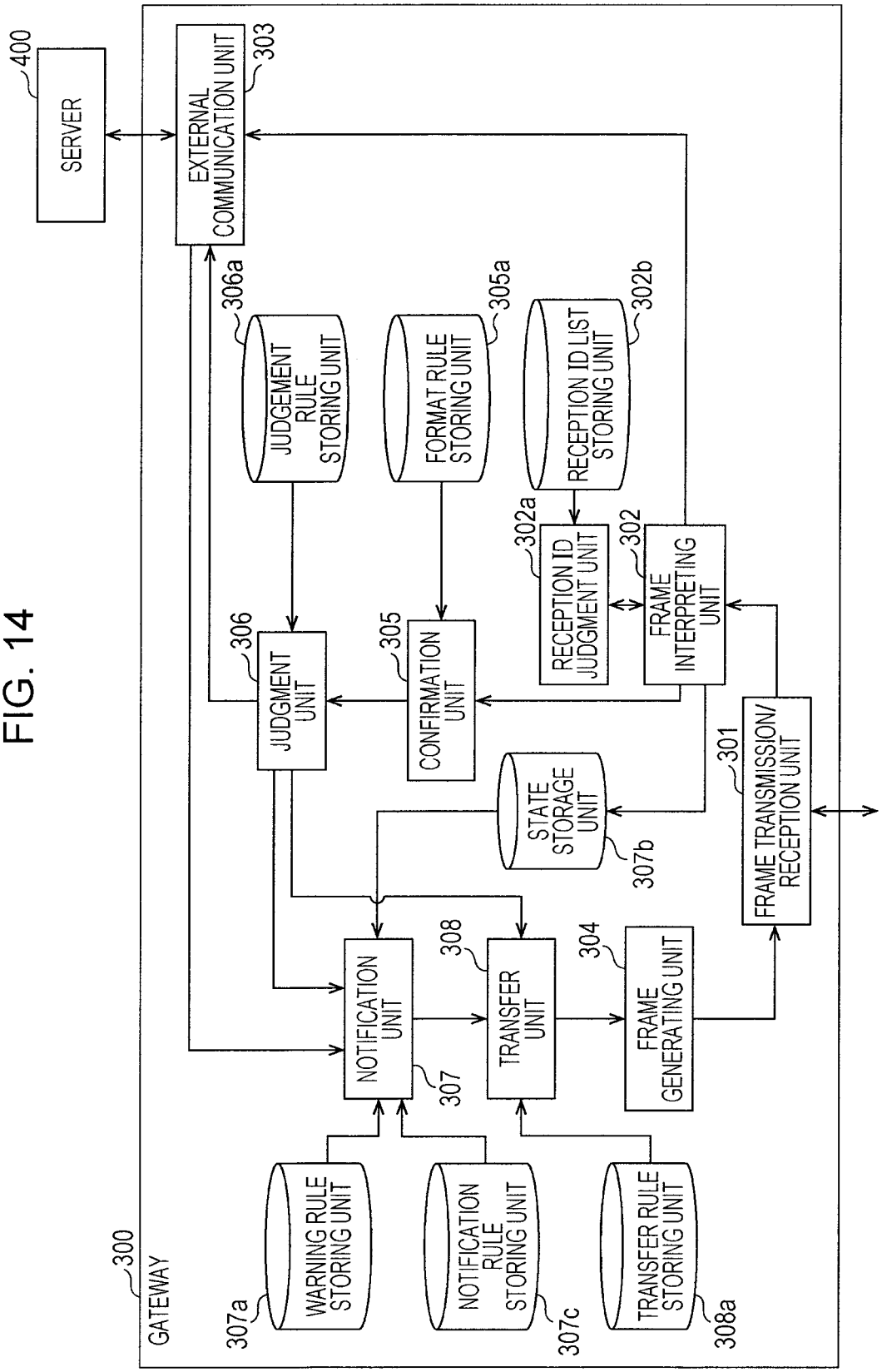
FIG. 14 is a configuration diagram of the gateway according to the first embodiment.

FIG. 14 is a configuration diagram of the gateway 300. Note that the server 400 is also illustrated in FIG. 14. The gateway 300 executes functions of frame transfer among busses, and also functions as a security device having functions for detecting attacks. Accordingly, the gateway 300 is configured including a frame transmission/reception unit 301, a frame interpreting unit 302, an external communication unit 303, a reception ID judgement unit 302a, a reception ID list storing unit 302b, a confirmation unit 305, a format rule storing unit 305a, a judgement unit 306, a judgement rule storing unit 306a, a notification unit 307, a warning rule storing unit 307a, a state storing unit 307b, a notification rule storing unit 307c, a transfer unit 308, a transfer rule storing unit 308a, and a frame generating unit 304, as illustrated in FIG. 14. The components are realized by communication circuits, processors or digital circuits that execute control programs stored in memory, and so forth, in the gateway 300.

Upon receiving a frame from any one of the CAN bus A 101, CAN bus B 102, and CAN bus C 103, the frame transmission/reception unit 301 sends the received frame to the frame interpreting unit 302. Also, upon receiving a frame generated at the frame generating unit 304, the frame transmission/reception unit 301 transmits the received frame to a bus decided by the transfer unit 308.

The frame interpreting unit 302 extracts the ID, DLC, and data, from a frame received from the frame transmission/reception unit 301, with each of the ID, DLC, and data distinguished, transmits the ID, DLC, and data to the external communication unit 303, and transmits the ID to the reception ID judgement unit 302a. Upon having received results from the reception ID judgement unit 302a that the ID is an ID that should be received, the frame interpreting unit 302 transmits the ID, DLC, and data to the confirmation unit 305 and state storing unit 307b, but upon receiving results that the ID is not an ID that should be received, discards the frame.

The state storing unit 307b receives the ID, DLC, and data from the frame interpreting unit 302, and stores the ID and data. The state storing unit 307b can store multiple times (e.g., two times) worth of data received in the past for each ID, in a storage medium such as memory, for example. The data and so forth stored by the state storing unit 307b is referenced by the notification unit 307 to find the current state of the automobile 500. The data stored in the state storing unit 307b will be described later by way of specific example with reference to FIG. 21.

The external communication unit 303 can function as a communication device. Upon receiving the ID, DLC, and data from the frame interpreting unit 302, the external communication unit 303 transmits these to the server 400 as log information. Upon receiving a determination request (determination commission) from the judgement unit 306, the external communication unit 303 transmits the determination request to the server 400. A determination request includes information indicating a communication address or the like of the gateway 300, for example. Upon receiving determination results from the server 400 in accordance with the determination request, the external communication unit 303 transmits the determination results to the notification unit 307.

The reception ID judgement unit 302a, upon receiving an ID from the frame interpreting unit 302, judges whether or not the ID is an ID that should be received, based on a reception ID list stored in the reception ID list storing unit 302b, and returns the results thereof to the frame interpreting unit 302.

The reception ID list storing unit 302b stores the reception ID list used by the reception ID judgement unit 302a to judge whether or not an ID is an ID that should be received. This reception ID list will be described later with reference to FIG. 15.

The confirmation unit 305, upon having received the ID, DLC, and data from the frame interpreting unit 302, the confirmation unit 305 confirms (determines) whether or not the ID, DLC, and data are unauthorized, based on format rules stored in the format rule storing unit 305a. In a case of having determined that the received ID, DLC, and data are not unauthorized, the confirmation unit 305 sends the ID, DLC, and data to the judgement unit 306, and otherwise discards the ID, DLC, and data without delivering to the judgement unit 306.

The format rule storing unit 305a stores format rules serving as a reference for the confirmation unit 305 to determine (confirm) whether or not the received ID, DLC, and data are legitimate. Format rules can be said to be stipulating unauthorized conditions that a fraudulent frame satisfies. A frame regarding which the confirmation unit 305 has confirmed to not fall under the unauthorized conditions is transferred between busses by the gateway 300, and a frame regarding which the confirmation unit 305 has confirmed to fall under the unauthorized conditions is not transferred (is discarded). Format rules will be described later with reference to FIG. 16.

Upon receiving the ID, DLC, and data from the confirmation unit 305, the judgement unit 306 determines whether or not to perform a determination request to the server 400 (i.e., whether or not the frame relating to the ID, DLC, and data is a frame suspect of being an attack frame), based on whether or not predetermined conditions indicated by judgment rules stored in the judgement rule storing unit 306a are satisfied. In a case where the judgement unit 306 determines that a determination request should be made to the server 400, the determination request is sent to the external communication unit 303, and when sending the determination request, the ID, DLC, and data are sent to the notification unit 307. In a case where the judgement unit 306 does not determine that a determination request should be made to the server 400 (i.e., in a case where the relevant frame was not determined to be a frame suspect of being an attack frame), the ID, DLC, and data are sent to the transfer unit 308.

The judgement rule storing unit 306a stores judgement conditions (predetermined conditions) for judgement rules made at the judgement unit 306 regarding whether or not the frame relating to the received ID, DLC, and data is a frame suspect of being an attack frame (whether or not a determination request should be made to the server). Judgement rules will be described later with reference to FIG. 17.

The notification unit 307, upon receiving the ID, DLC, and data from the judgement unit 306, determines whether or not transferring the frame that the gateway 300 has received may cause the automobile 500 to perform operations unintended by the driver, based on whether or not the warning conditions indicated by warning rules stored in the warning rule storing unit 307a are satisfied. In a case of determining that this may cause the automobile 500 to perform operations unintended by the driver (i.e., in a case of having determined that the warning conditions are satisfied), the notification unit 307 sends information, for generating a frame of ID5 indicating the No. (display switching signal) that instructs a warning notification to the head unit ECU 240, and the received ID, DLC, and data, to the transfer unit 308. In a case of determining that that this will not cause operations unintended by the driver (i.e., in a case of having determined that the warning conditions are not satisfied), the notification unit 307 sends the ID, DLC, and data to the transfer unit 308. Upon receiving from the external communication unit 303 the determination results received from the server 400, the notification unit 307 references the state storing unit 307b regarding the current state of the automobile 500, decides a No. relating to the notification content in accordance with the notification rules, based on whether or not warning conditions that the warning rules indicate have been satisfied, and sends, to the transfer unit 308, information for generating a frame of ID5 indicating the No. (notification switching signal) instructing the head unit ECU 240 of the notification contents.

The warning rule storing unit 307a stores warning rules indicating warning conditions for determining whether or not the notification unit 307 transferring the frame relating to the received ID, DLC, and data may cause the automobile 500 to perform operations unintended by the driver, or whether or not the automobile 500 may perform operations unintended by the driver when receiving the determination results from the server 400. Warning rules will be described later with reference to FIG. 18.

The notification rule storing unit 307c stores notification rules serving as a reference for deciding notification contents, based on the determination results from the server 400 that the notification unit 307 has received, and on the current state of the automobile 500. Notification rules will be described later with reference to FIG. 19.

Upon receiving the ID, DLC, and data from the judgement unit 306 or the notification unit 307, the transfer unit 308 sends an instruction to transmit to a bus set for each ID, and a frame generating instruction corresponding top the received ID, DLC, and data, to the frame generating unit 304, based on the transfer frame stored in the transfer rule storing unit 308a. In a case of having received information for generating a frame of 105 relating to an instruction to the head unit ECU 240 from the notification unit 307, the transfer unit 308 transmits an instruction to transmit to the CAN bus C 103, and a generating instruction for this frame of 105, to the frame generating unit 304.

The transfer rule storing unit 308a stores transfer rules indicating which bus an ID received by the transfer unit 308 should be transmitted to. Transfer rules will be described later with reference to FIG. 20.

The frame generating unit 304 generates a frame in accordance with the frame generating instruction received from the transfer unit 308, and transmits the generated frame and an instruction to transmit to a specified bus, to the frame transmission/reception unit 301.

1.3.1 Reception ID List at Gateway

FIG. 15 is a diagram illustrating an example of the reception ID list. The reception ID list indicates IDs of frames that can be received, for each of the busses (CAN bus A 101, CAN bus B 102, and CAN bus C 103) to which the gateway 300 is connected. In a case of having received a frame of an ID not shown in this reception ID list, the gateway 300 discards the frame (does not transfer that frame between busses). The reception ID list in the example in FIG. 15 shows that the IDs of frames that can be received from the CAN bus A 101 are 1, 2, and 3, and the ID of frames that can be received from the CAN bus B 102 is 4.

1.3.2 Format Rules

FIG. 16 is a diagram illustrating an example of format rules. Format rules stipulate a DLC for a legitimate frame, and the range of values indicated by data in the data field, for each frame ID. The gateway 300 determines whether the frame is a legitimate frame or not (fraudulent frame) in accordance with the format rules, and in a case where a fraudulent frame has been received, discards that frame (does not transfer that frame between busses).

According to the format rules in the example in FIG. 16, the gateway 300 determines only frames of which the DLC for frames of ID1 is 2, and also of which the range of values of steering angle indicated by data in the data field is −360 to 360, to be legitimate frames. All other frames are determined to be fraudulent frames.

1.3.3 Judgement Rules

FIG. 17 is a diagram illustrating an example of judgment rules. Judgement rules indicate predetermined conditions for determining whether or not a received frame is a frame suspect of being an attack frame (i.e., whether or not to make a determination request to the server 400). The judgment rules in the example in FIG. 17 indicate the threshold value of an absolute value of the amount of change of values indicated by the data in the data field, cycles stipulated for received frames, and so forth, for each frame ID. The threshold value of absolute value of the amount of change is an upper limit of the absolute value of difference between a value indicated by the data in the data field of the received frame, and a value indicated by the data in the data field of a frame of the same ID received the previous time. For example, in a case where this upper limit is exceeded, the predetermined conditions are satisfied, and the received frame is determined to be a frame suspect of being an attack frame (i.e., determination is made that determination by an external device that exists outside of the automobile 500 is necessary). That is to say, in a case where the amount of change exceeds the upper limit between a received frame and a frame received the previous time, the gateway 300 determines that the received frame is a frame suspect of being an attack frame, and transmits a determination request to the server 400. The cycle stipulated regarding frames is a reference relating to the reception interval between a received frame and the frame of the same ID received the previous time (stipulated cycle). In a case where this reference is deviated from by a predetermined margin (e.g., plus or minus 1 ms or the like), the predetermined conditions are satisfied, and the received frame is determined to be a frame suspect of being an attack frame (i.e., determination is made that determination by an external device that exists outside of the automobile 500 is necessary). That is to say, in a case where the reception interval between a received frame and a frame received the previous time deviates from the reference by the predetermined margin, the gateway 300 determines that the received frame is a frame suspect of being an attack frame, and transmits a determination request to the server 400.

According to the judgement rules in the example in FIG. 17, in a case where the absolute value of the amount of change of steering angle indicated by the data in a frame of 101 exceeds 200 when updating from the previous frame, or in a case where a frame of ID1 is received at a reception interval that is a shorter reception interval than the stipulated cycle 10 ms minus the predetermined margin or at a reception interval that is a longer reception interval than the stipulated cycle 10 ms plus the predetermined margin, the gateway 300 determines that the frame is a frame suspect of being a frame that has been transmitted unauthorizedly (a frame suspect of being an attack frame) (e.g., determination is made that determination by the external server 400 is necessary). Note that the gateway 300 can store the reception time of received frames for each ID, in order to identify reception intervals.

1.3.4 Warning Rules

FIG. 18 is a diagram illustrating an example of warning rules. Warning rules indicate warning conditions for determining whether or not the automobile 500 is in a state where operations unintended by the driver may be caused. The warning rules in the example in FIG. 18 indicate the threshold value or the like of an absolute value of the amount of change of values indicated by the data in the data field for each frame ID. The threshold value of absolute value of the amount of change is an upper limit of the absolute value of difference between a value updated by the frame and the value before updating. For example, in a case where this upper limit is exceeded, the warning conditions are satisfied, and the automobile 500 is determined to be in a state where operations unintended by the driver may be caused. That is to say, in a case where the amount of change exceeds the upper limit between a received frame and a frame received the previous time, the gateway 300 determines that the automobile 500 is in a state where operations unintended by the driver may be caused, and transmits a frame of 105 to the head unit ECU 240. When receiving the determination results from the server 400, the gateway 300 determines whether or not the automobile 500 is in a state where operations unintended by the driver may be caused, by determining whether or not the amount of change between the frame most recently received that is stored in the state storing unit 307b and the frame received the previous time exceeds the upper limit, for example, decides the notification contents in accordance with that determination and so forth, and transmits a frame of ID5 to the head unit ECU 240.

According to the warning rules in the example in FIG. 18, the gateway 300 determines that the automobile 500 is in a state where operations unintended by the driver may be caused in a case where the absolute value of the amount of change from the previous update exceeds 90 for data in a frame of ID1 indicating steering angle, or in a case where the absolute value of the amount of change from the previous update exceeds 50 for data in a frame of ID2 indicating speed of the vehicle.

1.3.5 Notification Rules

FIG. 19 illustrates an example of notification rules serving as a reference for deciding notification contents to be instructed to the head unit ECU 240. The notification contents are distinguished in the notification rules in FIG. 19 depending on whether a case before determining at the server 400, a case of having obtained unauthorized (abnormal) determination results from the server 400, and a case of having obtained normal determination results. In a case of before determining at the server 400, the warning conditions indicated by the warning rules being satisfied is a prerequisite for the notification unit 307 to decide notification contents. In a case where unauthorized (abnormal) determination results have been obtained from the server 400, the notification contents are distinguished depending on whether warning conditions indicated by the warning rules have been satisfied (when a warning is necessary) or warning conditions indicated by the warning rules have not been satisfied (when a warning is unnecessary).

According to the notification rules in the example in FIG. 19, when determination has been made that a warning is necessary but determination at the server 400 has not been made yet, the gateway 300 transmits a frame of ID5 including data indicating a No. 2 (see FIG. 9) notification switching signal instructing warning notification to the head unit ECU 240. In a case where determination has been made that warning is necessary when obtaining abnormal determination results from the server 400, the gateway 300 transmits a frame of ID5 including data indicating a No. 4 notification switching signal instructing a stop advisory to the head unit ECU 240. In a case where determination has been made that warning is not necessary when obtaining abnormal determination results from the server 400, the gateway 300 transmits a frame of ID5 including data indicating a No. 3 notification switching signal instructing an attack-detected notification to the head unit ECU 240. Further, in a case where normal determination results have been obtained from the server 400, the gateway 300 transmits a frame of ID5 indicating a No. 1 notification switching signal instructing a no-abnormality notification to the head unit ECU 240.

1.3.6 Transfer Rules

FIG. 20 is a diagram illustrating an example of transfer rules. Transfer rules indicate that transfer should be performed only in a case of having received from a transfer source bus frame of the object ID, and transfer destination busses for the transfer. No transfer is performed where a set of the object ID and transfer source bus is not indicated in the transfer rules.

According to the transfer rules in the example in FIG. 20, in a case of having received a frame of ID1 from the CAN bus A 101 for example, the gateway 300 transfers this frame to the CAN bus B 102 and CAN bus C 103. A frame of ID5 is a frame transmitted from the gateway 300, so no corresponding transfer source bus exists in the transfer rules in FIG. 20.

1.3.7 Data Stored in State Storing Unit 307b

FIG. 21 is a diagram illustrating an example of data stored in the state storing unit 307b. The state storing unit 307b stores IDs and data of multiple frames that the gateway 300 has received in the past for each ID. Note that FIG. 21 illustrates one set of data received in the past for each ID, for the sake of convenience. In this example, the steering angle (angle of steering) indicated by the data relating to a frame of ID1 that is currently stored is 5, the speed of the automobile indicated by the data relating to a frame of ID2 is 40, the pavement lane marking angle indicated by the data relating to a frame of ID3 is −8, and the automatic steering angle (angle relating to an automatic steering instruction for steering) indicated by the data relating to a frame of ID4 is 5.

1.3.8 Frame Reception Handling Processing at Gateway

Figure 22:
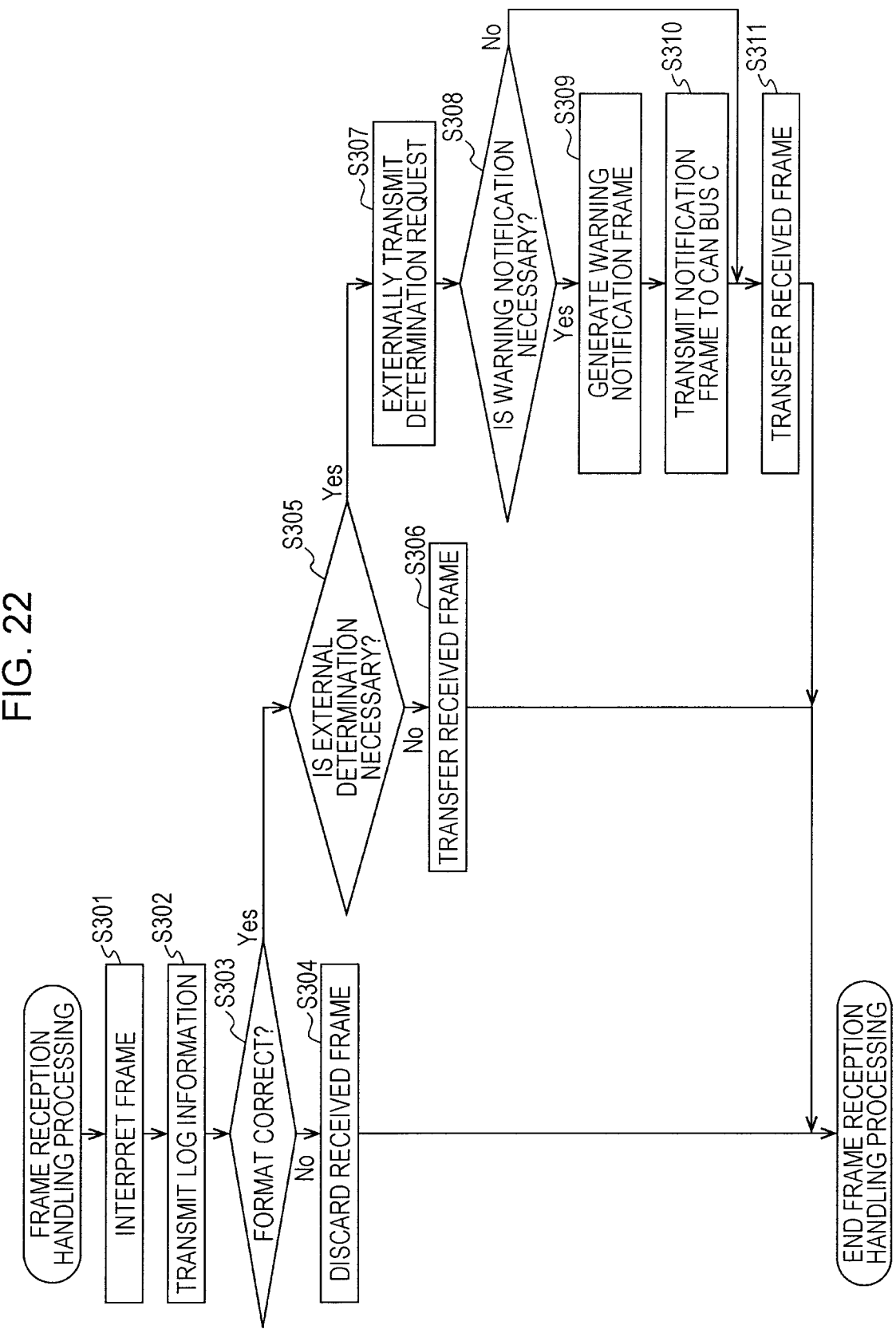
FIG. 22 is a flowchart illustrating an example of frame reception handling processing at the gateway according to the first embodiment.

FIG. 22 is a flowchart illustrating an example of frame reception handling processing at the gateway 300. Description will be made below regarding the frame reception handling processing with reference to FIG. 22.

The gateway 300 receives a frame from one of the busses, and interprets the frame (step S301). The gateway 300 transmits the ID, DLC, and data within the frame to the server 400 as log information (step S302).

Next, the gateway 300 confirms whether or not the received frame is legitimate, using the format rules (step S303). If the frame is not legitimate (i.e., in a case of a fraudulent frame), the gateway 300 discards the received frame (step S304) and ends the frame reception handling processing. Note that the gateway 300 may be configured such that in a case of having confirmed that the frame is unauthorized, the gateway 300 transmits a frame instructing that the head unit ECU 240 should be notified of a detected attack, in order to notify the driver or the like of detection of the fraudulent frame.

In a case where the received frame has been confirmed to be legitimate by the format rules in step S303, the gateway 300 determines whether or not determination at the server 400 is necessary (whether or not a frame suspect of being an attack frame), using the judgement rules (step S305).

In a case where determination is made in step S305 that determination at the server 400 is not necessary (not a frame suspect of being an attack frame), the gateway 300 transfers the received frame following the transfer rules (step S306), and the frame reception handling processing ends.

In a case where determination is made in step S305 that determination at the server 400 is necessary (a frame suspect of being an attack frame), the gateway 300 transmits a determination request (determination commission) to the server 400 (step S307).

Next, the gateway 300 determines whether or not the automobile 500 is in a state where operations unintended by the driver may be caused by transferring the received frame (whether or not warning is necessary), using the warning rules (step S308).

In a case where determination is made in step S308 that warning is necessary (the automobile 500 is in a state where operations unintended by the driver may be caused), the gateway 300 generates a frame of ID5 to make a warning notification to the head unit ECU 240 (step S309), and this frame is transmitted to the CAN bus C 103 (step S310).

In a case where determination is made in step S308 that warning is not necessary (the automobile 500 is not in a state where operations unintended by the driver may be caused), or in a case where the frame has already been transmitted in step S310, the gateway 300 transfers the received frame in accordance with the transfer rules (step S311).

1.3.9 Determination Results Reception Handling Processing at Gateway

Figure 23:
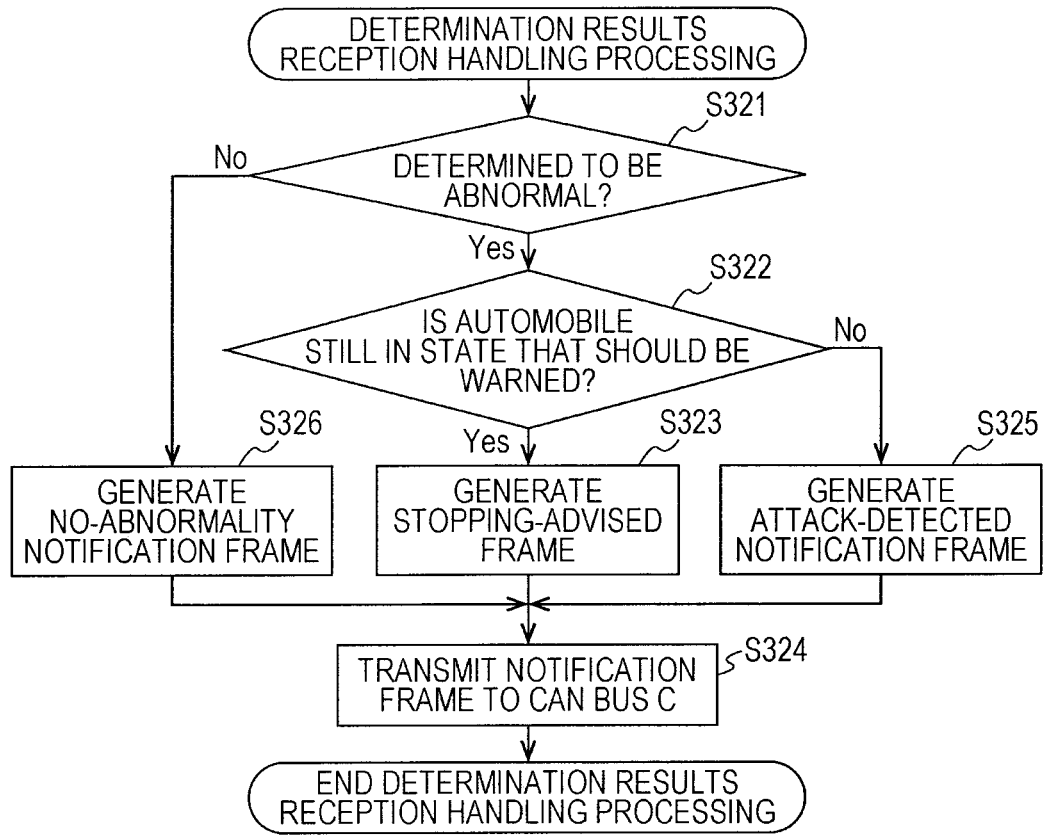
FIG. 23 is a flowchart illustrating an example of determination results reception handling processing at the gateway according to the first embodiment.

FIG. 23 is a flowchart illustrating an example of determination results reception handling processing at the gateway 300. Description will be made below regarding the determination results reception handling processing with reference to FIG. 23.

Upon having received determination results from the server, the gateway 300 determines whether the determination results are abnormal (fraudulent frame) or not (step S321).

In a case where the determination results are abnormal in step S321, the gateway 300 determines whether or not the automobile 500 is currently in a state where operations unintended by the driver may be caused (e.g., a state where unintended operations were caused immediately prior), based on the warning rules, using data stored in the state storing unit 307b (step S322).

In a case where determination is made in step S322 that the automobile 500 is in a state where operations unintended by the driver may be caused, the gateway 300 generates a frame of ID5 to notify the driver of a stop advisory at the head unit ECU 240 (step S323). Next, the gateway 300 transmits the generated frame of ID5 to the CAN bus C 103 to which the head unit ECU 240 is connected (step S324), and the determination results reception handling processing ends.

In a case where determination is made in step S322 that the automobile 500 is not in a state where operations unintended by the driver may be caused, the gateway 300 generates a frame of ID5 to notify the driver of an attack-detected notification at the head unit ECU 240 (step S325). Next, the gateway 300 transmits the generated frame of ID5 to the CAN bus C 103 to which the head unit ECU 240 is connected (step S324), and the determination results reception handling processing ends.

In a case where the determination results are normal in step S321, the gateway 300 generates a frame of ID5 to notify the driver of a no-abnormality notification at the head unit ECU 240 (step S326). Next, the gateway 300 transmits the generated frame of ID5 to the CAN bus C 103 to which the head unit ECU 240 is connected (step S324), and the determination results reception handling processing ends.

1.4 Server

The server 400 is a computer that exists outside of the automobile 500, and includes a processor (microprocessor), storage mediums such as memory, a hard disk, and so forth, communication circuits, and the like. The memory is ROM, RAM, and so forth, and can store control programs (computer programs serving as software) executed by the processor.

Figure 24:
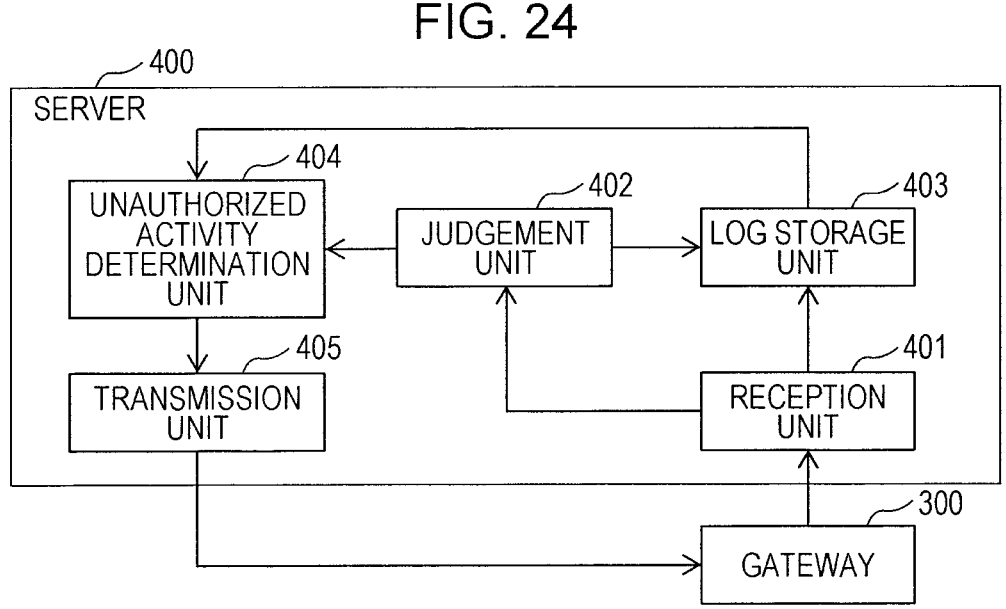
FIG. 24 is a configuration diagram of a server.

FIG. 24 is a configuration diagram of the server 400. Note that the gateway 300 is also illustrated in FIG. 24. The server 400 is configured including a reception unit 401, a judgement unit 402, a log storage unit 403, an unauthorized activity determination unit 404, and a transmission unit 405, as illustrated in FIG. 24. These components are realized by communication circuits or processors that execute control programs stored in memory, and so forth, in the server 400.

The reception unit 401 receives log information that is the set of the ID, DLC, and data, or a determination request (determination commission), transmitted from the gateway 300.

In a case where the reception unit 401 has received log information, which is a set of the ID, DLC, and data, the judgement unit 402 sends this log information to the log storage unit 403. In a case where the reception unit 401 has received a determination request, the judgement unit 402 outputs an instruction to the unauthorized activity determination unit 404, to the effect that determination should be made whether unauthorized (abnormal) or normal.

The log storage unit 403 receives the log information that is the set of the ID, DLC, and data, from the judgement unit 402, and stores this log information correlated with the time at which it was received. The log storage unit 403 sends the stored time, and ID, DLC, and data, in accordance with an instruction from the unauthorized activity determination unit 404. Note that the log information may be transmitted from the gateway 300 including the reception time of having received the frame relating to the ID, DLC, and data at the gateway 300 side, and in this case, it is sufficient for the server 400 to simply store log information including the reception time.

Upon receiving an instruction from the judgement unit 402 to determine whether unauthorized (abnormal) or normal, the unauthorized activity determination unit 404 obtains the log information by transmitting an instruction to the log storage unit 403, and determines whether unauthorized (abnormal) or not (normal), based on the log information. The transmission unit 405 transmits determination results of the unauthorized activity determination unit 404 to the gateway 300.

1.4.1 Abnormality Detection Processing at Server

Figure 25:
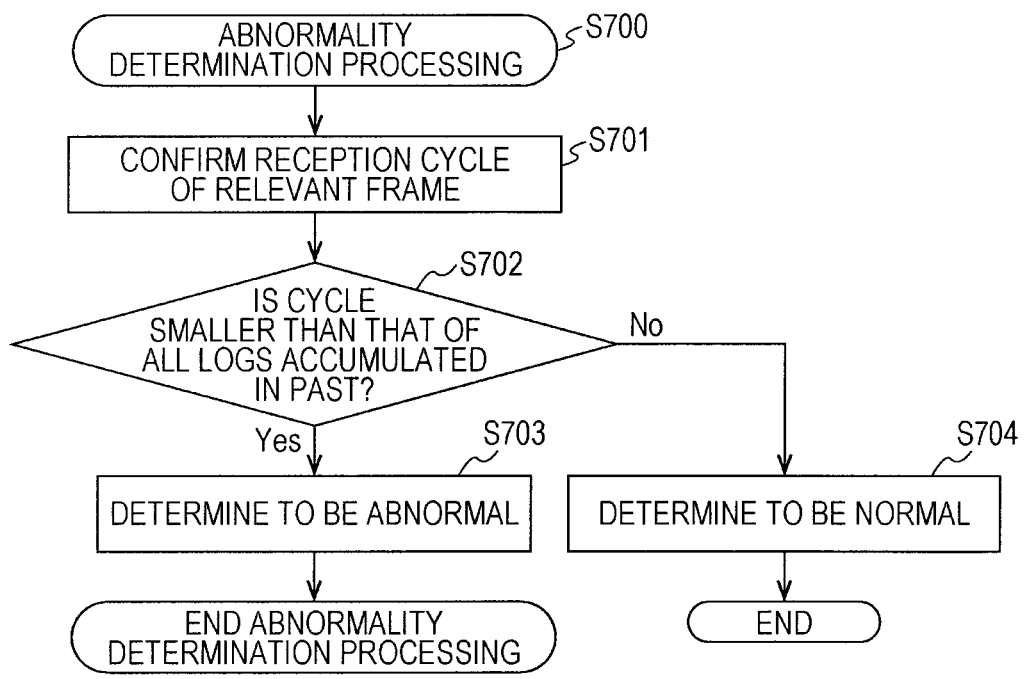
FIG. 25 is a flowchart illustrating an example of abnormality determination processing at the server.

FIG. 25 is a flowchart illustrating an example of abnormality detection processing at the server 400. Note that this is only an example of determination performed at the server 400 in response to a determination request from the gateway 300, and that the server 400 can perform determination using any determination method.

The server 400 obtains information relating to the frame that triggered the determination request by referencing the log storage unit 403, and confirms the reception cycle of that frame from past reception times corresponding to the ID of that frame (step S701). The server 400 then compares with the smallest (shortest) cycle of past reception cycles of frames of the same ID based on the log information that has been accumulated so far, and determines whether or not the cycle that is the reception interval between the frame that triggered the determination result and the frame the previous time is smaller than the smallest cycle (step S702). In a case where the cycle that is the reception interval between the frame that triggered the determination request and the frame the previous time is smaller, the server 400 makes an unauthorized (abnormal) determination (step S703), and otherwise determines to be normal (step S704).

1.4.2 Operations of Server

Figure 26:
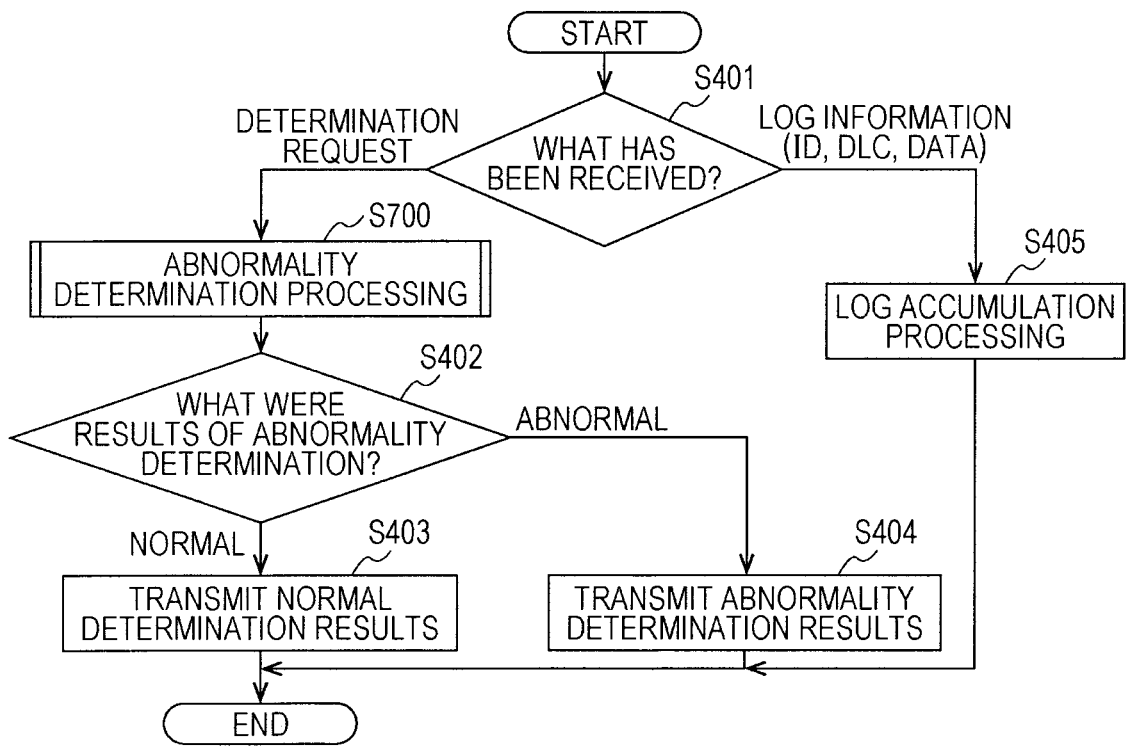
FIG. 26 is a flowchart illustrating an operation example of the server.

FIG. 26 is a flowchart illustrating an example of operations of the server 400. The server 400 determines whether received content is a determination request (determination commission), or log information (the set of ID, DLC, and data) (step S401).

In a case where a determination request has been received, the server 400 performs abnormality detection processing (FIG. 25) to determine whether the frame relating to the determination request is unauthorized (abnormal) or normal (step S700). Next, the server 400 distinguishes the results of the abnormality detection processing (step S402), and in a case where determination is made in the abnormality detection processing that the frame is normal, transmits normal determination results to the gateway 300 (step S403). In a case where determination is made in the abnormality detection processing that the frame is abnormal, abnormal (unauthorized) determination results are transferred to the gateway 300 (step S404).

Also, in a case of having determined in step S401 that log information was received, the server 400 correlates the log information that is the set of the ID, DLC, and data, with the time of reception, and accumulates in a storage medium such as memory, a hard disk, or the like (step S405).

1.5 Sequence Relating to Operations of Network System

FIG. 2 is a sequence diagram illustrating an example of operations of the network system 100. An example will be described here where log information that the gateway 300 transmits to the server 400 includes the frame reception time at the gateway 300.

The gateway 300, upon receiving frames from the busses connected thereto (step S1), extracts the ID, DLC, and data, correlates with the reception time as log information, and transmits the log information to the server 400 (step S2).

The server 400 receives the log information from the gateway 300, and thereupon accumulates the log information in the storage medium (step S3).

The gateway 300 confirms whether or not the frames received from the busses have a legitimate format or not (fraudulent frame) (step S4). In a case of having confirmed a fraudulent frame, the gateway 300 discards that frame and suppresses transfer (step S5).

In a case of having confirmed a frame of a legitimate format in step S4, the gateway 300 determine whether or not there is need to perform determination of that frame at the server 400 (i.e., whether or not that frame is a frame suspect of being an attack frame) (step S6). In a case where determination is made in step S6 that there is no need to perform determination at the server 400, the gateway 300 transfers the frame to another bus based on the transfer rules (step S7).

In a case where determination is made that there is need to perform determination of the received frame at the server 400, the gateway 300 transmits a determination request (determination commission) to the server 400 (step S8), and determines whether or not a warning notification is necessary (whether or not the automobile 500 is in a state where operations unintended by the driver may be caused by transferring the received frame), based on the warning rules (step S9). In a case of determining that a warning notification is necessary, the gateway 300 performs an instruction transmission relating to the notification to the head unit ECU 240 (step S10), and accordingly the head unit ECU 240 receives a frame instructing the warning notification (step S11).

In a case of having received the instruction for the warning notification, the head unit ECU 240 performs a display relating to the warning notification on the display (step S12).

After step S9, the gateway 300 transfers the received frame to another bus (step S13).

Upon receiving the determination request (determination commission) from the gateway 300, the server 400 performs determination of whether unauthorized, which is one or the other of whether the frame is in an abnormal state having been unauthorizedly transmitted, or not (normal state) using the accumulated log information, and transmits the determination results to the gateway 300 (step S15).

The gateway 300 that has received the determination results in step S15 decides the notification contents in accordance with the determination results, and whether or not the automobile 500 currently is in a state where operations unintended by the driver may be caused (step S16). The gateway 300 transmits a frame indicating the notification contents decided in step S16 to the head unit ECU 240 (step S17).

In a case of having received a frame indicating the notification contents in step S17, the head unit ECU 240 switches the display contents of the display in accordance with the notification contents (step S18).

1.6 Advantages of First Embodiment

In the network system 100 according to the present embodiment, the server 400 outside of the automobile 500 is requested to determine a frame, suspect to have been unauthorizedly transmitted (frame suspect of being an attack frame), which has been received by the gateway 300 of the onboard network of the automobile 500, and in a case where the automobile 500 is in a state where dangerous operations may be caused by this frame, control is effected to make notification of a warning calling attention. Also, in a case where determination results are received from the server 400 that indicate an abnormality, and the automobile 500 is in a state where operations unintended by the driver may be caused (e.g., when operations unintendedly the driver are continuing), control is effected to make notification of a stop advisory. In a case where determination results of an abnormality have been received, but the automobile 500 is not in a state where operations unintended by the driver may be caused, control is effected to make notification that unauthorized activity has been detected.

Accordingly, the driver can be informed at an early state of the fact that a frame, suspect of being unauthorizedly transmitted, is on the bus of the onboard network. Notifications useful to the driver can be made by changing the notifications in accordance with the behavior of the automobile, taking into consideration the determination results at the server 400.

Second Embodiment

A network system that has been configured with the above-described network system 100 having been partially modified will be described, where instead of transmitting a determination request to the external server 400 in a case where a frame transmitted to the bus within the automobile may be a fraudulent frame (attack frame), a determination request is transmitted to other automobiles around that automobile.

2.1 Overall Configuration of Network System 100A

Figure 27:
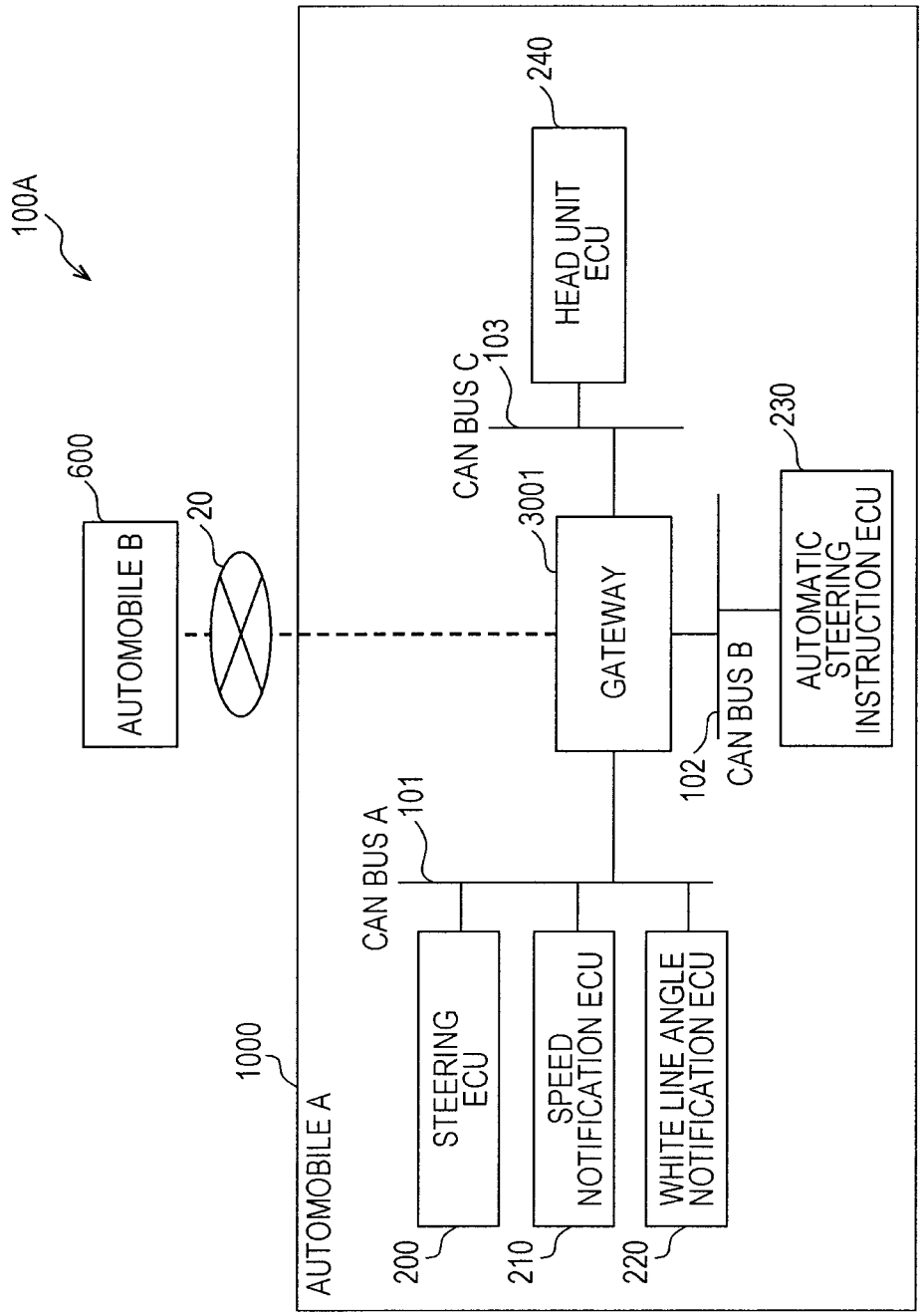
FIG. 27 is a diagram illustrating the overall configuration of a network system according to a second embodiment.

FIG. 27 is a diagram illustrating the overall configuration of a network system 100A according to a second embodiment. The network system 100A is a network system which, in a case where determination has been made that a frame transmitted to a bus in an automobile A 1000 is a frame suspect of being an attack frame, and also the frame may cause the automobile A 1000 to perform operations unintended but the driver, the driver is speedily notified. Further, in a case where another automobile B 600 in the vicinity of the automobile A 1000 has been requested for determination and determination results have been received, notification contents are decided in accordance with the determination results and the behavior of the automobile A 1000, and notification is made to the driver accordingly.

The network system 100A is configured including the automobile A 1000, automobile B 600, and a network 20 serving as a communication path between these automobiles. The network 20 may include the Internet or the like, but may be a wireless communication path for directly exchanging wireless signals in inter-vehicle communication, for example.

The automobile A 1000 has an onboard network configured including multiple electronic control units (ECU) that perform communication relating to frames, via an in-vehicle bus. The ECUs are connected to various types of devices such as in-vehicle control devices, sensors, actuators, user interface devise, and so forth. The onboard network specifically has the CAN bus A 101, CAN bus B 102, and CAN bus C 103, installed in the automobile A 1000, as illustrated in FIG. 27. The steering ECU 200, the speed notification ECU 210, the pavement lane marking angle notification ECU 220, and a gateway 3001 are connected to the CAN bus A 101. The automatic steering instruction ECU 230 and the gateway 3001 are connected to the CAN bus B 102. The head unit ECU 240 and the gateway 3001 are connected to the CAN bus C 103. Components that are the same as those described in the first embodiment are denoted in FIG. 27 by the same reference symbols as in FIG. 1, and description will be omitted as appropriate. The gateway 3001 is a partial modification of the gateway 300 illustrated in the first embodiment, and points not described here in particular are the same as in the gateway 300. Note that the gateway 3001 has a communication device (communication circuits, etc.) for communication with automobiles (the automobile B 600 in this example) present in the vicinity (within around several tens of meters, for example, or the like) of the automobile A 1000.

The gateway 3001 transfers data frames among the busses. The gateway 3001 confirms the ID of a received frame, based on the reception ID list that it stores, and filters frames. The gateway 3001 also has functions of detecting attacks, and determines whether or not a frame that is suspect to have been unauthorizedly transmitted (i.e., a frame that is suspect of being an attack frame), based on whether or not the received frame satisfies judgement conditions relating to reception cycles, amount of change of data within the frame, and so forth, decided beforehand for each ID, and in a case of determining to be a frame suspect of being an attack frame, transmits a determination request (determination commission) to the automobile B 600 in the vicinity. Specifically, the gateway 3001 receives the frame suspect of being an attack frame from the CAN bus B 102, for example. Also, in a case where determination is made that the automobile A 1000 may perform operations unintended by the driver as a result of transfer of that frame, such as the steering ECU 200 being controlled, for example, based on warning conditions decided beforehand, this frame is transferred to the CAN bus A 101 upon having instructed the head unit ECU 240 to give a warning (a display notifying the driver of the warning, etc.). The gateway 3001, at the time of instructing the warning, transmits a determination request (determination commission) including position information of the automobile A 1000, steering information (e.g., orientation information indicating the direction of travel of the automobile A 1000 for example), and speed information, to the automobile B 600 in the vicinity of the automobile A 1000.

The automobile B 600 (onboard equipment and so forth of the automobile B 600) that has received the determination request (determination commission) from the gateway 3001 performs determination of whether abnormal or not (normal), depending on whether the automobile A 1000 that is the requesting source of the determination request is a hazardous presence to the automobile B 600, and returns the determination results to the gateway 3001 of the automobile A 1000.

Figure 28:
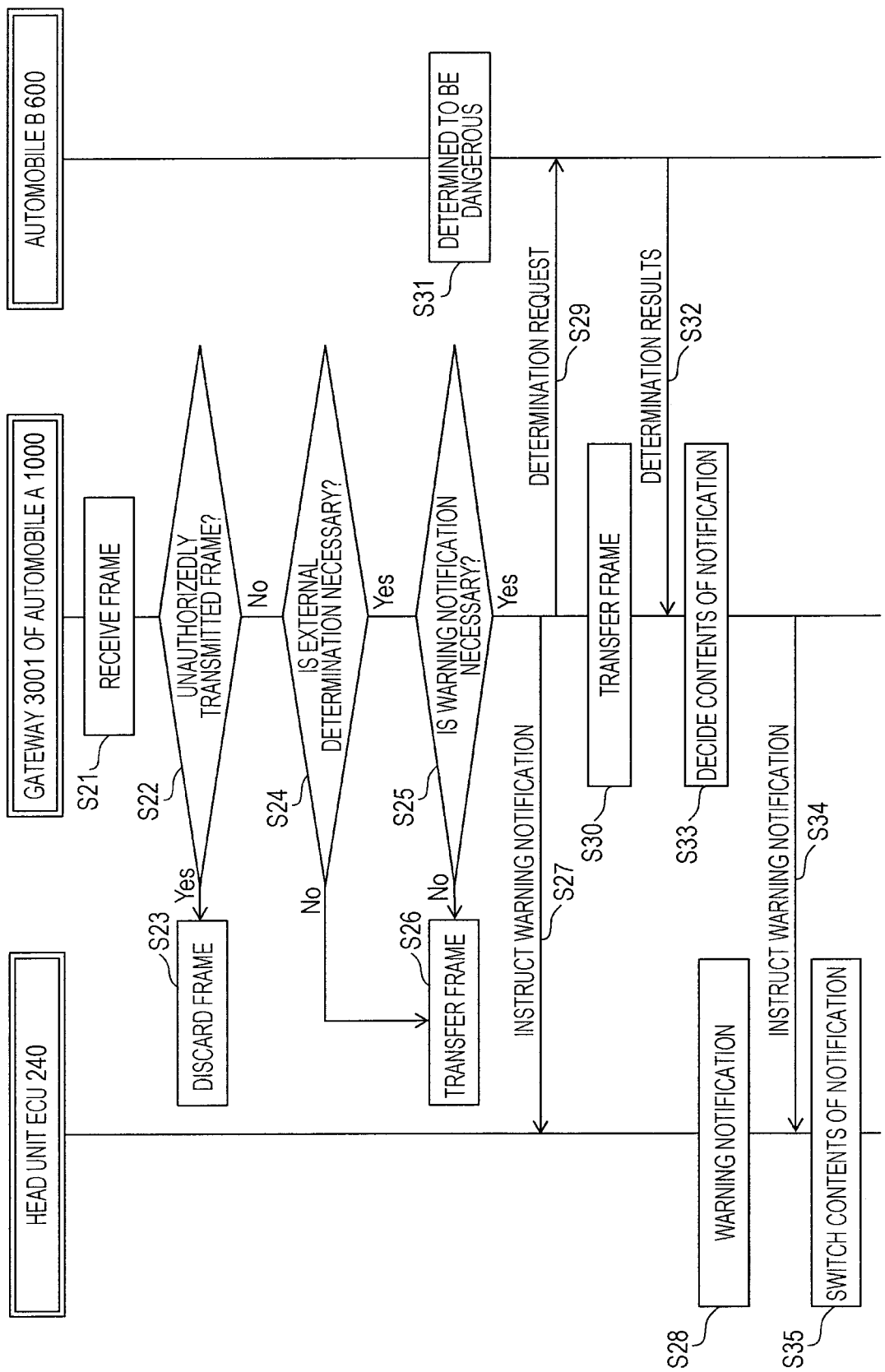
FIG. 28 is a sequence diagram illustrating an operation example of the network system according to the second embodiment.

The gateway 3001 decides the contents of notification to the driver, in accordance with the determination results from the automobile B 600 and the current state of the automobile A 1000 (steering angle, speed of the automobile A 1000, and so forth), and instructs the head unit ECU 240 thereof. FIG. 28 illustrates an example of operations of such a network system 100A. Details of the operations will be described later.

2.2 Gateway

Figure 29:
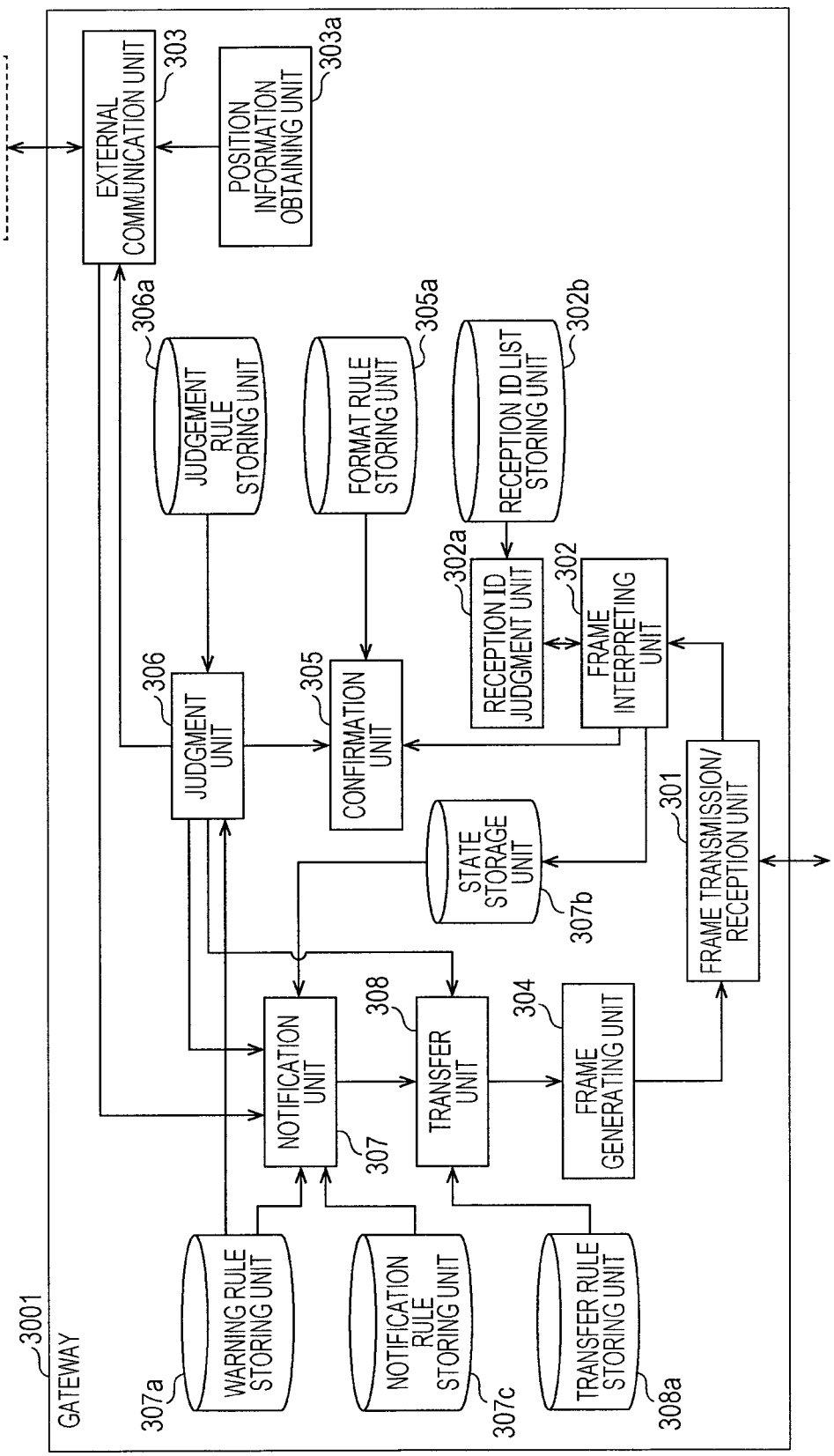
FIG. 29 is a configuration diagram of a gateway according to the second embodiment.

FIG. 29 is a configuration diagram of the gateway 3001. Note that the automobile B 600 is also illustrated in FIG. 29. The gateway 3001 executes functions of frame transfer among busses, and also functions as a security device having functions for detecting attacks, in the same way as with the gateway 300 in the first embodiment. Accordingly, the gateway 3001 is configured including the frame transmission/reception unit 301, the frame interpreting unit 302, the external communication unit 303, a position information obtaining unit 303a, the reception ID judgement unit 302a, the reception ID list storing unit 302b, the confirmation unit 305, the format rule storing unit 305a, the judgement unit 306, the judgement rule storing unit 306a, the notification unit 307, the warning rule storing unit 307a, the state storing unit 307b, the notification rule storing unit 307c, the transfer unit 308, the transfer rule storing unit 308a, and the frame generating unit 304, as illustrated in FIG. 29. These components are realized by communication circuits, processors or digital circuits that execute control programs stored in memory, and so forth, in the gateway 3001. Components of the gateway 3001 illustrated in FIG. 29 that are the same as those of the gateway 300 described in the first embodiment (see FIG. 14) are denoted by the same reference symbols as in FIG. 14, and description will be omitted as appropriate.

The position information obtaining unit 303a obtains information indicating the current position of the automobile A 1000, such as latitude, longitude, altitude, and so forth, from a GPS (Global Positioning System) receiver or the like used for automotive navigation for example, and transmits to the external communication unit 303.

Upon having received a determination request (determination commission) from the judgement unit 306, the external communication unit 303 transmits a determination request, to which the position information obtained from the position information obtaining unit 303a has been added, to the automobile B 600 in the vicinity of the automobile A 1000. The external communication unit 303 adds steering information and speed information obtained from sensors, ECUs, and so forth of various parts of the automobile A 1000, to the determination request in the same way as with the position information, and transmits the determination request. Note that the external communication unit 303 in the present embodiment does not externally transmit log information that is a set of the ID, DLC, and data, obtained from the frame interpreting unit 302. Upon receiving determination results from the automobile B 600 in response to the determination request, the external communication unit 303 transmits the determination results to the notification unit 307.

Upon receiving the ID, DLC, and data from the confirmation unit 305, the judgement unit 306 determines whether or not the frame relating to that ID, DLC, and data is a frame suspect of being an attack frame, based on whether or not judgement rules stored in the judgement rule storing unit 306a are satisfied. In a case of having determined that the received frame is a frame suspect of being an attack frame, the judgement unit 306 can determine that a determination request should be made to the external automobile B 600. Note however, that an arrangement may be made as one example regarding the judgement unit 306 of the gateway 3001 according to the present embodiment, where determination is made that a determination request should be made to the automobile B 600 only in a case where the received frame is a frame suspect of being an attack frame and also warning conditions indicated by the warning rules stored in the warning rule storing unit 307a are satisfied. That is to say, determination is made regarding whether or not transferring of the frame received by the gateway 3001 may cause operations of the automobile A 1000 unintended by the driver, based on whether or not warning conditions indicated by the warning rules stored in the warning rule storing unit 307a are satisfied, and determination is made that a determination request should be made to the automobile B 600 only in a case where operations unintended by the driver may be caused. In a case where the judgement unit 306 determines that a determination request should be made to the automobile B 600, the determination request is sent to the external communication unit 303, and when sending that determination request, the ID, DLC, and data are sent to the notification unit 307. In a case where the judgement unit 306 has not determined that a determination request should be made to the automobile B 600, the ID, DLC, and data is sent to the transfer unit 308.

The judgement rule storing unit 306a stores judgement rules indicating judgement conditions regarding whether or not the frame relating to the received ID, DLC, and data is a frame suspect of being an attack frame.

Upon having received the ID, DLC, and data from the judgement unit 306, the notification unit 307 sends information for generating a frame of ID5 that indicates a No. (notification switching signal) instructing a warning notification to the head unit ECU 240, and the received ID, DLC, and data, to the transfer unit 308. Although the notification unit 307 in the gateway 3001 according to the present embodiment does not directly judge whether or not warning conditions indicated by the warning rules are satisfied, the ID, DLC, and data are transmitted only in a case where warning conditions are satisfied at the judgement unit 306, so control is effected relating to instructing the head unit ECU 240 of the warning notification only in a case where operations unintended by the driver may be caused. The notification unit 307, upon having received from the external communication unit 303 the determination results received from the automobile B 600, references the state storing unit 307b regarding the current state of the automobile A 1000, and decides a No. relating to the communication contest in accordance with the notification rules. The notification unit 307 then sends the transfer unit 308 information for generating a frame of ID5, indicating the No. (notification switching signal) instructing these notification contents to the head unit ECU 240.

The notification rule storing unit 307c stores notification rules serving as a reference for deciding notification contents, based on the determination results from the automobile B 600 that the notification unit 307 has received, and on the current state of the automobile A 1000. These notification rules are the same as those exemplified in FIG. 19.

2.3 Frame Reception Handling Processing at Gateway

Figure 30:
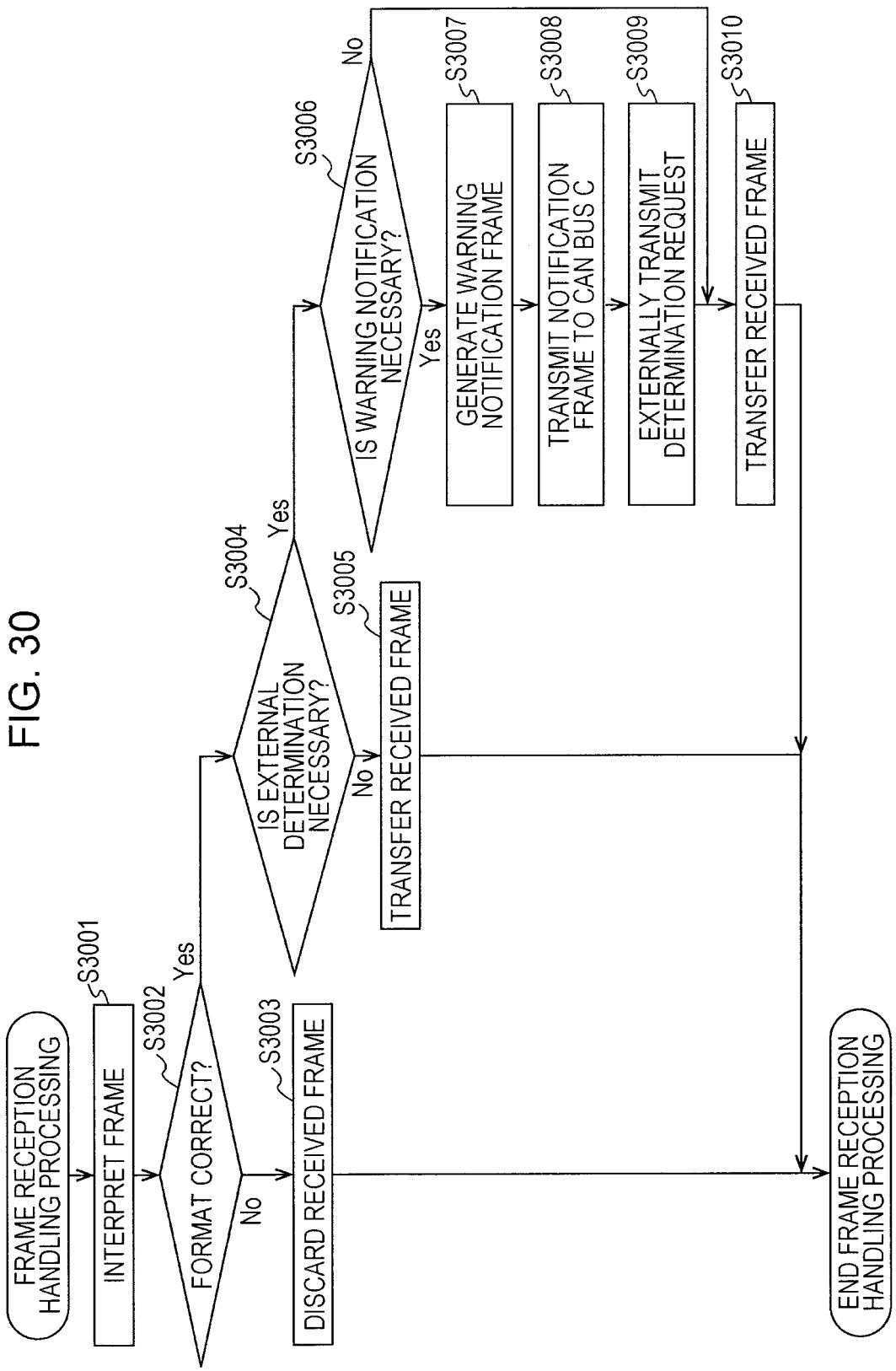
FIG. 30 is a flowchart illustrating an example of frame reception handling processing at the gateway according to the second embodiment.

FIG. 30 is a flowchart illustrating an example of frame reception handling processing at the gateway 3001. Description will be made below regarding the frame reception handling processing with reference to FIG. 30.

The gateway 3001 receives a frame from one of the busses, and interprets the frame (step S3001).

Next, the gateway 3001 confirms whether or not the received frame is legitimate, using the format rules (step S3002). If the frame is not legitimate (i.e., in a case of a fraudulent frame), the gateway 3001 discards the received frame (step S3003) and ends the frame reception handling processing. Note that the gateway 3001 may be configured such that in a case of having confirmed that the frame is unauthorized, the gateway 3001 transmits a frame instructing that the head unit ECU 240 should be notified of a detected attack, in order to notify the driver or the like of detection of the fraudulent frame.

In a case where the received frame has been confirmed to be legitimate by the format rules in step S3002, the gateway 3001 determines whether or not determination at an external automobile is necessary, according to whether or not the frame is a frame suspect of being an attack frame, using the judgement rules (step S3004).

In a case where determination is made in step S3004 that determination at an external automobile is not necessary (not a frame suspect of being an attack frame), the gateway 3001 transfers the received frame following the transfer rules (step S3005), and the frame reception handling processing ends.

In a case where determination is made in step S3004 that determination at an external automobile is necessary (a frame suspect of being an attack frame), the gateway 3001 determines whether or not the automobile A 1000 is in a state where operations unintended by the driver may be caused by transferring the received frame (whether or not warning is necessary), using the warning rules (step S3006).

In a case where determination is made in step S3006 that warning is necessary (the automobile A 1000 is in a state where operations unintended by the driver may be caused), the gateway 3001 generates a frame of ID5 to make a warning notification to the head unit ECU 240 (step S3007), transmits this frame to the CAN bus C 103 (step S3008), and further transmits a determination request (determination commission) to the external automobile B 600 with the position information, steering information, and speed information attached (step S3009).

In a case where determination is made in step S3006 that warning is not necessary, or in a case where the frame has already been transmitted in step S3009, the gateway 3001 transfers the received frame in accordance with the transfer rules (step S3010).

2.4 Determination Results Reception Handling Processing at Gateway

Figure 31:
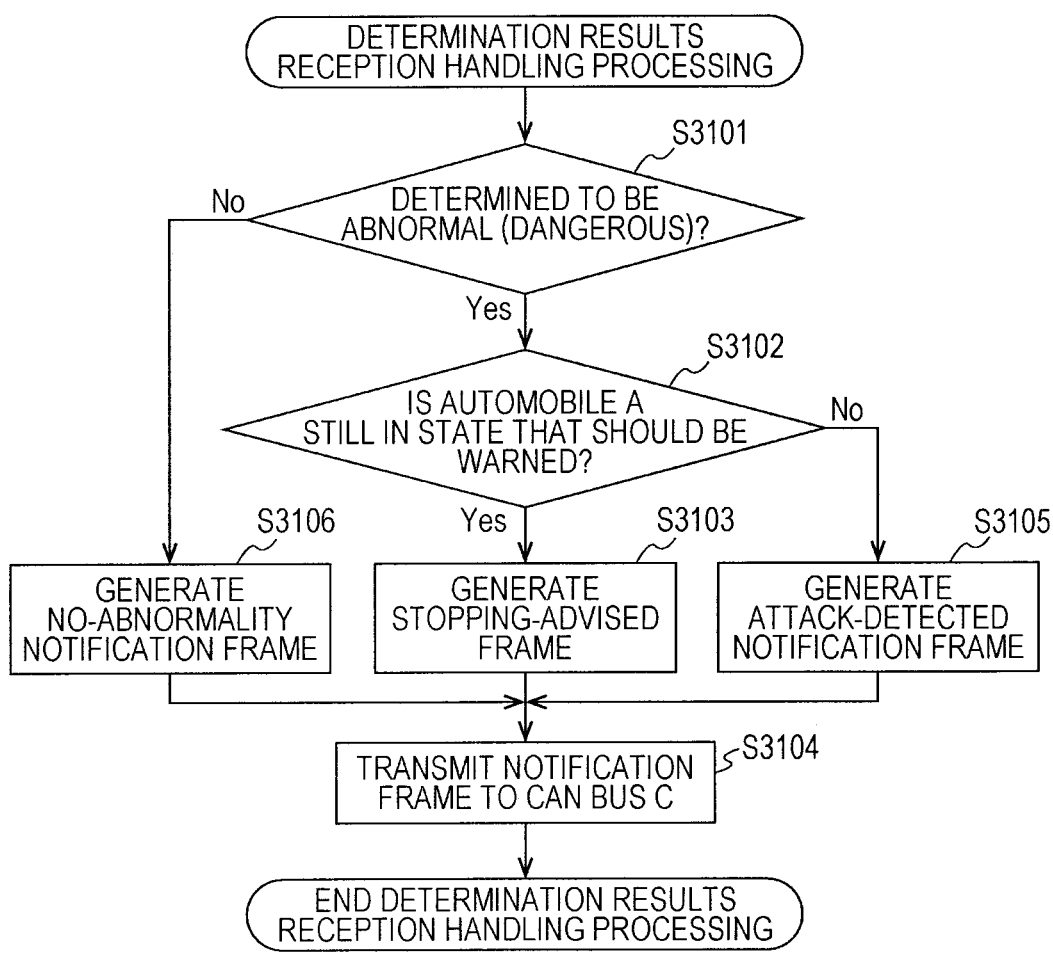
FIG. 31 is a flowchart illustrating an example of determination results reception handling processing at the gateway according to the second embodiment.

FIG. 31 is a flowchart illustrating an example of determination results reception handling processing at the gateway 3001. Description will be made below regarding the determination results reception handling processing with reference to FIG. 31.

Upon having received determination results from the automobile B 600, the gateway 3001 determines whether the determination results are abnormal (a state where the automobile A 1000 is a hazard to the automobile B 600) or not (step S3101).

In a case where the determination results are abnormal in step S3101, the gateway 3001 determines whether or not the automobile A 1000 is currently in a state where operations unintended by the driver may be caused (e.g., a state where unintended operations were caused immediately prior), based on the warning rules, using data stored in the state storing unit 307b (step S3102).

In a case where determination is made in step S3102 that the automobile A 1000 is in a state where operations unintended by the driver may be caused, the gateway 3001 generates a frame of ID5 to instruct notification of the driver of a stop advisory at the head unit ECU 240 (step S3103). Next, the gateway 3001 transmits the generated frame of ID5 to the CAN bus C 103 to which the head unit ECU 240 is connected (step S3104), and the determination results reception handling processing ends.

In a case where determination is made in step S3102 that the automobile A 1000 is not in a state where operations unintended by the driver may be caused, the gateway 3001 generates a frame of ID5 to instruct notification of the driver of an attack-detected notification at the head unit ECU 240 (step S3105). Next, the gateway 3001 transmits the generated frame of ID5 to the CAN bus C 103 to which the head unit ECU 240 is connected (step S3104), and the determination results reception handling processing ends.

In a case where the determination results are normal in step S3101, the gateway 3001 generates a frame of ID5 to notify the driver of a no-abnormality notification at the head unit ECU 240 (step S3106). Next, the gateway 3001 transmits the generated frame of ID5 to the CAN bus C 103 to which the head unit ECU 240 is connected (step S3104), and the determination results reception handling processing ends.

Figure 32:
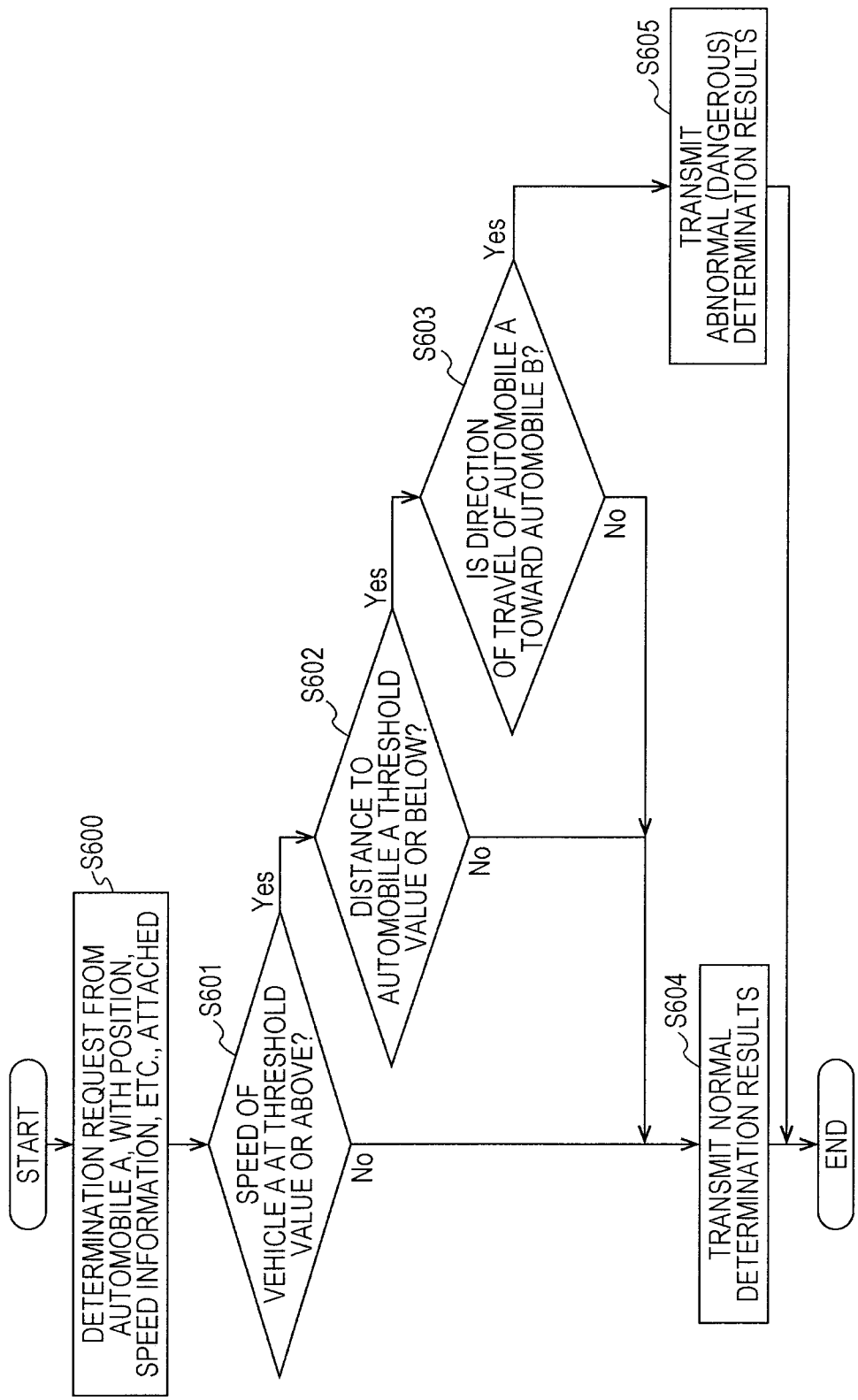
FIG. 32 is a flowchart illustrating an operation example in accordance with a determination request at an automobile B.

2.5 Operation Example of Automobile B Corresponding to Determination Request FIG. 32 is a flowchart illustrating an operation example (abnormality determination processing) corresponding to a determination request at the automobile B 600. Note that this is only an example of determination performed at the automobile B 600 in response to a determination request from the gateway 3001, and that the automobile B 600 can perform determination using any determination method. The automobile B 600 here determines whether or not there is an abnormality according to whether or not the automobile A 1000 is a hazard to itself. Abnormality determination processing will be described below with reference to FIG. 32.

The automobile B 600 receives a determination request from the automobile A 1000, with information indicating the position, speed, direction of travel, etc., of the automobile A 1000 attached (step S600).

Next, the automobile B 600 determines whether or not the speed of the automobile A 1000 is at a threshold value that has been set beforehand or greater (step S601). One example of this threshold value is 60 km/h. In a case where the speed of the automobile A 1000 is below the threshold value in step S601, the automobile B 600 transmits normal determination results to the automobile A 1000 (step S604). That is to say, if the current speed of the automobile A 1000 is below 60 km/h for example, the automobile B 600 determines that the automobile A 1000 is not hazardous (abnormal) with regard to the automobile B 600, and transmits normal determination results in response of the determination request.

In a case where the speed of the automobile A 1000 is determined to be at or above the threshold value in step S601, the automobile B 600 determines whether or not the distance to the automobile A 1000 is at a threshold value that has been set beforehand or smaller (step S602). An example of this threshold value is 5 m. In a case where determination is made in step S602 that the distance to the automobile A 1000 is greater than the threshold value, the automobile B 600 transmits normal determination results to the automobile A 1000 (step S604). That is to say, if the distance between the position indicated by the position information of the automobile A 1000 and the current position of the automobile B 600 is greater than 5 m, the automobile B 600 determines that the automobile A 1000 is not hazardous (abnormal) with regard to the automobile B 600, and transmits normal determination results in response of the determination request.

In a case where the distance to the automobile A 1000 is determined to be at or below the threshold value in step S602, the automobile B 600 determines whether or not the direction of travel of the automobile A 1000 is directed toward the automobile B 600 (step S603). In a case where determination is made in step S603 that the direction of travel of the automobile A 1000 is not directed toward the automobile B 600, the automobile B 600 transmits normal determination results to the automobile A 1000 (step S604). That is to say, if the position and direction of travel of the automobile A 1000 do not indicate the direction of the current position of the automobile B 600, the automobile B 600 determines that the automobile A 1000 is not hazardous (abnormal) with regard to the automobile B 600, and transmits normal determination results in response of the determination request.

In a case where determination is made in step S603 that the direction of travel of the automobile A 1000 is directed toward the automobile B 600, the automobile B 600 transmits determination results of abnormal (hazardous) to the automobile A 1000 (step S605).

2.6 Sequence Relating to Operations of Network System

FIG. 28 is a sequence diagram illustrating an example of operations of the network system 100A. The gateway 3001, receives frames from the busses connected thereto (step S21), and confirms whether or not the frames received have a legitimate format or not (fraudulent frame) (step S22). In a case of having confirmed a fraudulent frame, the gateway 3001 discards that frame and suppresses transfer (step S23).

In a case of having confirmed a frame of a legitimate format in step S22, the gateway 3001 determine whether or not there is need to perform determination regarding the effects of that frame at an external automobile (i.e., whether or not that frame is a frame suspect of being an attack frame) (step S24).

In a case where determination is made in step S24 that the received frame is a frame suspect of being an attack frame, the gateway 3001 determines whether or not a warning notification is necessary (whether or not the automobile A 1000 is in a state where operations unintended by the driver may be caused by transferring the received frame), based on the warning rules (step S25).

In a case where determination is made in step S24 that there is no need to perform determination, or in a case where determination is made in step S25 that no warning notification is necessary, the gateway 3001 transfers the frame to another bus based on the transfer rules (step S26).

In a case of determining in step S25 that a warning notification is necessary, the gateway 3001 performs an instruction transmission relating to the notification to the head unit ECU 240 (step S27), and accordingly the head unit ECU 240 receives a frame instructing the warning notification and performs display relating to the warning notification on the display (step S28). Also, in a case of determining that a warning notification is necessary, the gateway 3001 transmits a determination request (determination commission) to the automobile B 600 present in the vicinity of the automobile A 1000 (step S29), and transfers the frame that had been received to another bus (step S30).

Upon receiving the determination request (determination commission) from the gateway 3001, the automobile B 600 performs determination of danger, which is one or the other of whether the automobile A 1000 is in an abnormal state that is dangerous to the automobile B 600, or not (normal state), and transmits the determination results to the gateway 3001 (step S32).

The gateway 3001 that has received the determination results in step S32 decides the notification contents in accordance with the determination results, and whether or not the automobile A 1000 currently is in a state where operations unintended by the driver may be caused (step S33). The gateway 3001 transmits a frame indicating the notification contents decided in step S33 to the head unit ECU 240 (step S34).

In a case of having received a frame indicating the notification contents in step S34, the head unit ECU 240 switches the display contents of the display in accordance with the notification contents (step S35).

2.7 Advantages of Second Embodiment

In the network system 100A according to the present embodiment, only in a case where a frame suspect of being unauthorizedly transmitted (a frame suspect of being an attack frame) has been received at the gateway 3001 in the onboard network of the automobile A 1000, and the automobile A 1000 is in a state where operations unintended by the driver may be caused, is control effected to make notification of a warning calling attention, and also determination is requested to an external device (onboard equipment or the like of another automobile B 600) present in the vicinity of the automobile A 1000. In a case where determination results are received from the automobile B 600 (onboard equipment or the like of another automobile B 600) that indicate an abnormality (that the automobile A 1000 is a danger to the automobile B 600), and the automobile A 1000 is in a state where operations unintended by the driver may be caused (e.g., when operations unintendedly the driver are continuing), the gateway 3001 effects control to make notification of a stop advisory. In a case where determination results of an abnormality have been received, but the automobile A 1000 is not in a state where operations unintended by the driver may be caused, control is effected to make notification that unauthorized activity has been detected.

Accordingly, the driver can be informed at an early state of the fact that a frame, suspect of being unauthorizedly transmitted, is on the bus of the onboard network. Notifications useful to the driver can be made by changing the notifications in accordance with the behavior of the automobile, taking into consideration the determination results by the automobile B 600 regarding whether or not the automobile A 1000 is a danger (abnormal) or not.

OTHER EMBODIMENTS

First and second embodiments have been described above as exemplary illustrations of technology relating to the present disclosure. However, the technology according to the present disclosure is not restricted to this, and also is applicable to embodiments where modifications, replacements, additions, omissions, etc., have been performed as appropriate. For example, the following modifications are also included in an embodiment of the present disclosure.

(1) Although an example has been illustrated in the above embodiments where, when a frame suspect of being an attack frame is detected on an onboard network, a display is made by the head unit ECU 240 on a display to call attention of the driver (see FIGS. 10 through 13), presentation information (warning notification, stop advisory, etc.) to be transmitted to the driver may be presented by a method other than display (e.g., audio played from a speaker, or the like). The notification method of warning notifications and the like in the network system may be notifying by changing the state of lighting of a room light, or may be notifying by changing the tightness of the seatbelt, or may be notifying by causing the steering or pedal to vibrate. Also, classification of presentation information to serve as the contents of notification, such as the no-abnormality notification, warning notification, attack-detected notification, and stop advisory, illustrated in FIG. 9, may be set in any way, and further, specific presentation contents (e.g., display contents) are not restricted to those exemplified in FIGS. 10 through 13, and may be anything.

(2) An example has been illustrated in the above-described embodiments where gateways 300 and 3001 that perform monitoring of frames on an onboard network in an automobile, and so forth, cooperate with the head unit ECU 240 to give notifications (warning notifications, etc.) to the driver under certain conditions. This onboard network may be installed in vehicles other than automobiles (e.g., motorcycles, etc.) Also, the object of the notifications (warning notifications, etc.) is not restricted to the driver of the vehicle, and may be passengers of the vehicle, devices (other vehicles, etc.) that exist in the vicinity of the vehicle. Notification to the object of notification may be performed via a server or another device. For example, one vehicle may have an annunciation device to control the lit state of emergency blinking display lights, in order to perform notification to other vehicles under certain conditions, based on monitoring of frames on the onboard network of the one vehicle. Although description has been made in the above embodiments that the gateways 300 and 3001 have communication functions (external communication unit) for communication with the outside, an arrangement may be made where the vehicle has a communication device (communication unit) separate from the gateways 300 and 3001, and the gateways 300 and 3001 communicate with the outside of the vehicle via this communication device. An example of a network system having this annunciation device, communication device, and so forth, will be described with reference to FIG. 33.

Figure 33:
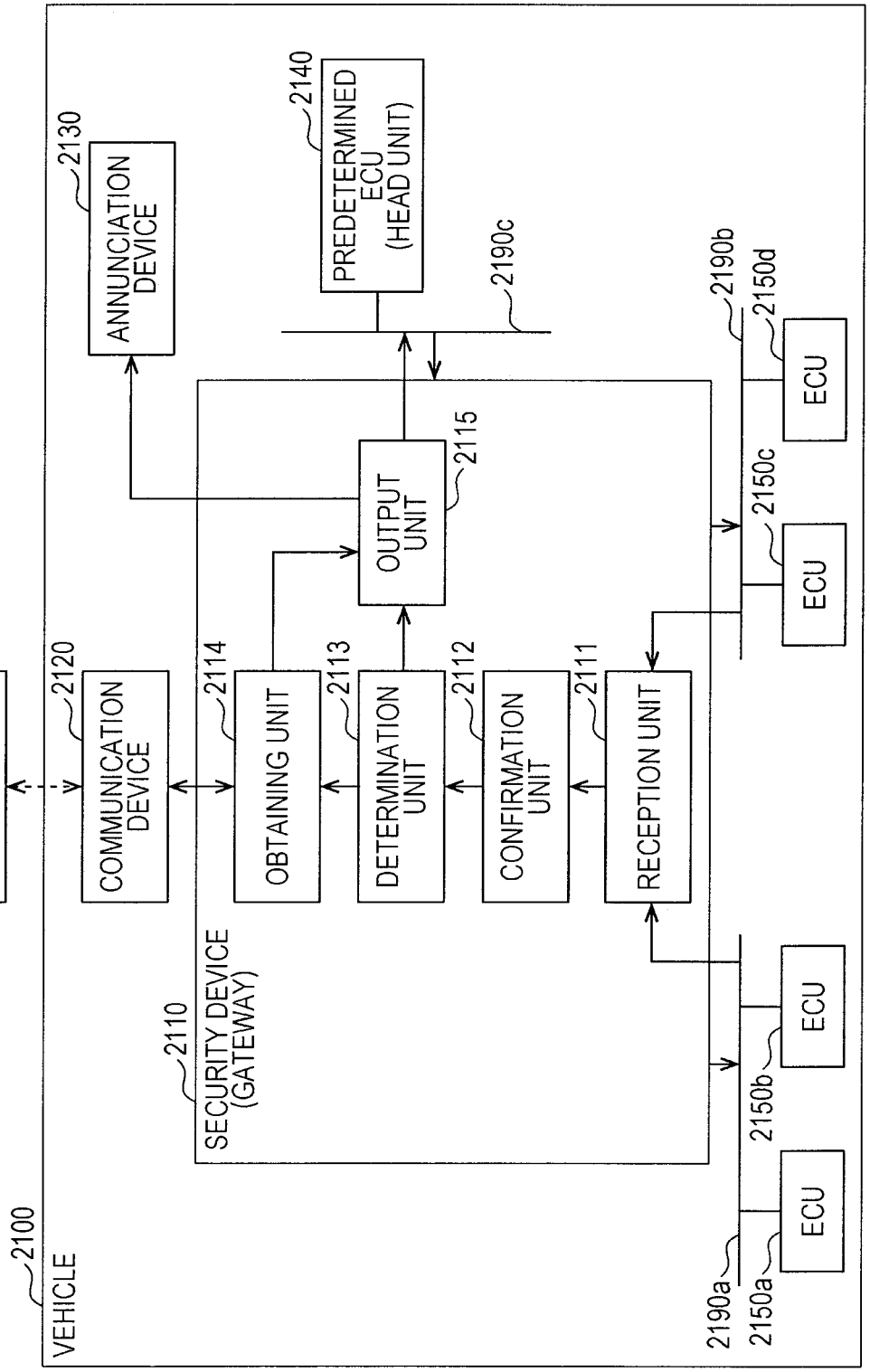
FIG. 33 is a schematic configuration diagram of a network system.

FIG. 33 illustrates the configuration of a network system 2000 according to an embodiment. The network system 2000 has a vehicle 2100 and an external device 2200.

The vehicle 2100 has a security device 2110 that is connected to a bus 2190*a*, a bus 2190*b*, and a bus 2190*c*, and monitors these busses. The vehicle 2100 further has a communication device 2120 that communicates with the external device 2200, a predetermined ECU (head unit) 2140 that has information presentation function, ECUs 2150*a* through 2150*d*, and an annunciation device 2130 for external annunciation from the vehicle 2100. The annunciation device 2130 is an emergency blinking display light for example, and may be a siren or the like, for example. The security device 2110 has a reception unit 2111, a confirmation unit 2112, a determination unit 2113, an obtaining unit 2114, and an output unit 2115. The reception unit 2111 is equivalent to the reception function portion of the frame transmission/reception unit 301 described above, and receives frames from one bus. The confirmation unit 2112 is equivalent to the above-described confirmation unit 305, and confirms whether or not a frame received from one bus by the reception unit 2111 falls under predetermined conditions. The determination unit 2113 is equivalent to the above-described judgement unit 306, and determines whether or not predetermined conditions are satisfied to distinguish whether a frame received by the reception unit 2111 may be an attack frame.

In a case where the confirmation unit 2112 confirms that a frame received by the reception unit 2111 falls under the predetermined conditions, the determination unit 2113 does not have to determine that the predetermined conditions have been satisfied. Note that the predetermined conditions used for determination by the determination unit 2113 with regard to a frame are conditions including at least one of a reception interval between the frame and a same-kind preceding frame that has the same ID as the frame and that is received earlier by the reception unit 2111, a difference between data contents of the frame and data contents of the same-kind preceding frame, and a correlativity between contents of a different-kind preceding frame that has a different ID from the frame and that is received earlier by the reception unit 2111 and contents of that frame. The obtaining unit 2114 controls the communication device 2120 so that a determination request is transmitted to the external device 2200 in a case where the determination unit 2113 has determined that the predetermined conditions are satisfied, and obtains determination results transmitted from the external device 2200 in accordance to the determination request, via the communication device 2120. Note that the communication device 2120 may transmit, to the external device 2200, log information relating to individual frames received by the reception unit 2111 of the security device 2110.

The output unit 2115 outputs first presentation information (e.g., a warning notification) in a case where the determination unit 2113 has determined that the predetermined conditions have been satisfied, and outputs second presentation information (e.g., stop advisory, attack-detected notification, no-abnormality notification, etc.) in a case where the obtaining unit 2114 has obtained the determination results from the external device 2200. The first presentation information includes control information to cause the annunciation device 2130 to perform annunciation, and the output of the first presentation information by the output unit 2115 may include transmission of the first presentation information to the annunciation device 2130. The output unit 2115 may perform output of the first presentation information and second presentation information by presenting (display, generating vibrations, sounding of a buzzer, lighting a light, output of audio, etc.), or may perform this by transmission to the predetermined ECU 2140 (transmission of a frame including each presentation information to the bus 2190c to which the predetermined ECU 2140 is connected). The predetermined ECU 2140 presents the first presentation information in a case of receiving a frame including the first presentation information, and presents the second presentation information in a case of receiving a frame including the second presentation information. With regard to the presentation timing of the first presentation information, the output unit 2115 may output the first presentation information when the determination unit 2113 determines that the predetermined conditions have been satisfied.

An arrangement may be made wherein, in a case where the determination unit 2113 has determined that the predetermined conditions have been satisfied, the first presentation information is output when warning conditions (e.g., conditions based on warning rules stored in the above-described warning rule storing unit 307a) are satisfied, and the first presentation information is not output when the warning conditions are not satisfied. The output unit 2115 may distinguish whether or not the warning conditions have been satisfied by distinguishing based on the contents of one or multiple frames received by the reception unit 2111 in the past. An arrangement may be made where, in a case of the obtaining unit 2114 having obtained determination results from the external device 2200, the output unit 2115 outputs information selected from multiple different information that differ from the first presentation and that have been set beforehand, in accordance with whether or not the determination results indicate normality, as the second presentation information. An arrangement may also be made where, in a case of the obtaining unit 2114 having obtained determination results from the external device 2200, the output unit 2115 outputs information selected from multiple different information that differ from the first presentation information and that have been set beforehand, in accordance with whether or not the warning conditions have been satisfied, and the determination results thereof, as the second presentation information. Note that the security device 2110 may be a gateway device, but does not necessarily have to be a gateway device.

The external device 2200 may be a device that receives a determination request from the vehicle 2100 and performs determination of whether abnormal or not, and transmits determination results to the vehicle 2100, and may be a server (e.g., the server 400), another vehicle present in the vicinity of the vehicle 2100 (e.g., the automobile B 600), a roadside device present in the vicinity of the vehicle 2100, a signal device, or the like. The vehicle 2100 is an automobile, motorcycle, or the like, and has an onboard network configured including multiple ECUs that are connected to various types of devices in the vehicle such as control devices, sensors, actuators, user interface devices, and so forth, and that perform communication relating to frames via busses in the vehicle.

The external device 2200 may be a device that transmits determination results to the communication device 2120 by determining whether or not an attack frame has been transmitted at the vehicle, based on log information in a case of having received a determination request. The determination results indicate one or the other of whether normal or not (abnormal), for example. The external device 2200 may be a device that transmits determination results to the communication device 2120 by observing operations of the vehicle from the outside of the vehicle and determining whether the operations of the vehicle are normal or not, or may be another vehicle in the vicinity of the vehicle 2100 in a case where the determination unit 2113 has determined that the predetermined conditions are satisfied.

(3) Although description has been made in the above embodiments regarding an exemplary illustration where judgment rules used for determination of a frame suspect to having been unauthorizedly transmitted (a frame suspect of being an attack frame) are rules relating to reception cycle (transmission cycle) of frames or the amount of change in values of data fields, but any nature of CAN frames may be used to determine whether or not a frame is a frame suspect of being an attack frame.

(4) Although description has been made in the above embodiments that when a determination request is transmitted to a server or another automobile and determination results are received, only notification contents are decided (i.e., only switching of notification contents is performed), rules stored at the gateways 300 and 3001 may be added, updated, etc., so that frames of the same ID as the frame that triggered the determination request are not transferred among busses.

(5) Although description was made in the above second embodiment that the automobile B 600 makes determination of abnormal or not is based on information such as the position, speed, direction of travel, and so forth, attached to the determination request received from the automobile A 1000 onboard equipment such as sensors or the like in the automobile B 600 may be used to measure the position, speed, or direction of travel of the automobile A 1000, and perform the determinations in steps S601 through S603 using these measurement results. For example, the automobile B 600 may identify the position and so forth of the automobile A 1000 that is the source of the determination request, by measuring the intensity of radio waves when receiving wireless signals set beforehand as the determination request from the automobile A 1000.

(6) An onboard network that performs communication in accordance with the CAN protocol has been illustrated in the above-described embodiments. This CAN protocol is to be understood to have a broad meaning, encompassing derivative protocols such as CAN with Flexible Data Rate (CANFD) and so forth. Also, communication protocols other than the CAN protocol may be used in the network system, such as Ethernet (registered trademark), Media Oriented Systems Transport (MOST, a registered trademark), FlexRay (registered trademark), or the like, for example. In the above embodiments, the cyber security countermeasure on an onboard network mounted in an automobile has been described, but the applicable range is not limited thereto. The technology according to the present disclosure is not limited to an automobile, and is also applicable to mobility such as a construction machine, an agricultural machine, a ship, a railway, an airplane, or the like. That is to say, the technology according to the present disclosure is applicable to a mobility network and a mobility network system. Further the technology according to the present disclosure is also applicable to a communication network used in an industrial control system such as a factory or a building, or a communication network for controlling an embedded device.

(7) The order of execution of the procedures in the various types of processing illustrated in the above-described embodiments (e.g., the procedures illustrated in FIGS. 2, 22, 23, 25, 28, and 30 through 32, and so forth) is not necessarily restricted to the above-described order. The order of execution may be interchanged, multiple procedures may be performed in parallel, part of the procedures may be omitted, and so forth, without departing from the essence of the disclosure.

(8) Although the gateway and other ECUs in the above embodiments have been described as being devices including digital circuits such as processors, memory, and so forth, analog circuits, communication circuits, and the like, other hardware components may be included, such as hard disk devices, displays, keyboards, mice, and so forth. Also, the functions thereof may be realized by dedicated hardware (digital circuits, etc.) instead of realizing the functions by software by control programs stored in memory being executed by a processor.

(9) Part or all of the components configuring the device in the above-described embodiments may be configured as a single system large scale integration (LSI). A system LSI is a super-multi-functional LSI manufactured integrating multiple components on a single chip, and specifically is a computer system configured including a microprocessor, ROM, RAM, and so forth. A computer program is recorded in the RAM. The system LSI realizes its functions by the microprocessor operating according to the computer program. The parts of the components making up the above devices may be individually formed into one chip, or part or all may be included in one chip. While description has been made regarding a system LSI, there are different names such as IC, LSI, super LSI, and ultra LSI, depending on the degree of integration. The circuit integration technique is not restricted to LSIs, and dedicated circuits or general-purpose processors may be used to realize the same. A field programmable gate array (FPGA) which can be programmed after manufacturing the LSI, or a reconfigurable processor where circuit cell connections and settings within the LSI can be reconfigured, may be used. Further, in the event of the advent of an integrated circuit technology which would replace LSIs by advance of semiconductor technology or a separate technology derived therefrom, such a technology may be used for integration of the functional blocks, as a matter of course. Application of biotechnology is a possibility.

(10) Part or all of the components of which the above-described devices are configured may be configured as an IC card detachably mountable to each device or a standalone module. The IC card or module is a computer system configured including a microprocessor, ROM, RAM, and so forth. The IC card or module may include the above-described super-multifunctional LSI. The IC card or module achieves its functions by the microprocessor operating according to the computer program. The IC card or module may be tamper-resistant.

(11) One aspect of the present disclosure may be a fraud detection method including all or part of the processing procedures illustrated in FIG. 22, FIG. 23, FIG. 30, FIG. 31, and so forth. For example, the fraud detection method may be a fraud detection method used in an onboard network system where multiple electronic control units exchange frames via one or multiple busses, the method including a reception step of receiving a frame from a bus, a determination step (e.g., steps S305, S3004) of determining whether or not, with regard to the frame received in the reception step, predetermined conditions to distinguish whether or not the frame may be an attack frame are satisfied, a first presentation step (e.g., steps S309, S310, S3007, S3008) of presenting first presentation information in a case where determination is made in the determining step that predetermined conditions are satisfied, an obtaining step (e.g., S307, S3009, etc.) of effecting control to where a determination request is transmitted to an external device existing outside of the vehicle in a case where determination is made in the determining step that predetermined conditions are satisfied, and obtaining determination results transmitted from the external device in response to that determination request, and a second presentation step (e.g., steps S323 through S326 and S3103 through S3106) of presenting second presentation information in a case where determination results from the external device have been obtained in the obtaining step. An aspect of the present disclosure may be a computer program which realizes processing relating to this fraud detection method by a computer, or may be digital signals made up of the computer program. An aspect of the present disclosure may be the computer program or the digital signals recorded in a computer-readable recording medium, such as for example, a flexible disk, a hard disk, a CD-ROM, MO, DVD, DVD-ROM, DVD-RAM, BD (Blu-ray (registered trademark) Disc), semiconductor memory, or the like. The present disclosure may also be the digital signals recorded in these recording mediums. An aspect of the present disclosure may be an arrangement where the computer program or the digital signals are transmitted over an electric communication line, wireless or cable communication line, a network of which the Internet is representative, data broadcasting, or the like. Also, an aspect of the present disclosure may be a computer system having a microprocessor and memory, where the memory records the computer program, and the microprocessor operates according to the computer program. The program or the digital signals may be recorded in the recording medium and transported, or the program or the digital signals may be transported over the network or the like, and thereby be executed by another computer system that is independent.

(12) Forms realized by optionally combining the components and functions described in the above embodiments and the above modifications are also included in the scope of the present disclosure.

The present disclosure is applicable to handling attack frames and the like in an onboard network.

What is claimed is:

1. A security device connected to a plurality of networks in a vehicle, the plurality of networks comprising a first network and a second network, the security device comprising:
  processing circuitry; and
  storage including at least one set of instructions that, when executed by the processing circuitry, cause the processing circuitry to perform operations including:
    receiving a first frame from the first network;
    determining whether to transmit a determination request for the first frame outside the vehicle;

transmitting the determination request outside the vehicle, in a case where the determining determines to transmit the determination request outside the vehicle;

transmitting, before obtaining a determination result from outside the vehicle in accordance with the determination request, the first frame to the second network;

obtaining the determination result from outside the vehicle in accordance with the determination request; and outputting presentation information in accordance with the determination result.

2. The security device according to claim 1, wherein the vehicle includes a plurality of electronic control units that transmit and receive frames in accordance with Controller Area Network (CAN) protocol, via the plurality of networks.

3. The security device according to claim 1, wherein the security device is a gateway device connected to the plurality of networks in the vehicle.

4. The security device according to claim 1, wherein the operations further include:
confirming whether the first frame received from the first network is fraudulent; and
transferring the first frame to the second network in a case where the confirming does not confirm that the first frame is fraudulent, and not transferring the first frame to the second network in a case where the confirming confirms that the first frame is fraudulent.

5. The security device according to claim 1, wherein
the determining determines to transmit the determination request in a case where the first frame is suspected of being an attack frame.

6. The security device according to claim 1, wherein
the presentation information is output in a case where the determining determines to transmit the determination request.

7. The security device according to claim 1, wherein the operations further include:
transmitting a second frame including the presentation information to the first network in the vehicle in a case where the determining determines to transmit the determination request.

8. The security device according to claim 1, wherein the operations further include:
in the determining, a determination is made regarding whether warning conditions are satisfied, and
the presentation information is output in a case where the warning conditions are satisfied.

9. The security device according to claim 8, wherein the determining determines whether the warning conditions are satisfied based on content of at least one frame previously received in the receiving.

10. The security device according to claim 1, wherein the operations further include:
transmitting a third frame including the presentation information to the first network in a case where the obtaining obtains the determination result from outside the vehicle.

11. A network system, comprising:
a security device;
an external device;
a vehicle that includes a communication device, the communication device configured to communicate with the external device;
a plurality of networks that includes a first network and a second network; and
a plurality of electronic control units that is installed in the vehicle and that exchanges frames via the plurality of networks,
wherein the security device includes
processing circuitry, and
storage including at least one set of instructions that, when executed by the processing circuitry, cause the processing circuitry to perform operations including:
receiving a first frame from the first network;
determining whether to transmit a determination request for the first frame outside the vehicle;
transmitting the determination request to the external device that is outside of the vehicle, in a case where the determining determines to transmit the determination request outside the vehicle;
transmitting, before obtaining a determination result from the external device in accordance with the determination request, the first frame to the second network;
obtaining the determination result from the external device in accordance with the determination request; and
outputting presentation information in accordance with the determination result.

12. The network system according to claim 11, wherein the plurality of electronic control units includes a first electronic control unit that includes information presentation functions and the first electric control unit is connected to a third network included in the plurality of networks,
wherein the operations further include:
transmitting a second frame including the presentation information to the third network, in the case where the obtaining obtains the determination result from the external device,
and wherein the first electronic control unit
presents the presentation information in response to receiving the second frame including the presentation information.

13. The network system according to claim 11, wherein the vehicle includes an annunciation device that performs annunciation externally from the vehicle,
wherein the presentation information includes control information to cause the annunciation device to perform the annunciation,
and wherein the operations of the security device further include:
transmitting the presentation information to the annunciation device.

14. The network system according to claim 11, wherein the communication device transmits log information, relating to frames received by the security device, to the external device,
wherein the determination request is transmitted to the external device via the communication device,
wherein the determination results are obtained from the external device in accordance with the determination request, via the communication device, and wherein the external device determines whether the frame is an attack frame, based on the log information, in response to receiving the determination request, and transmits the determination results to the communication device.

15. The network system according to claim 11, wherein the external device determines whether the operations of the vehicle are normal or not by observing operations of the vehicle from outside of the vehicle, and transmits the determination result to the communication device.

16. The network system according to claim 15, wherein the external device is another vehicle that is in a vicinity of the vehicle.

17. The network system according to claim 15, wherein the external device is a roadside device that is in a vicinity of the vehicle.

18. A fraud detection method used in a network system, in a vehicle, where a plurality of electronic control units exchange frames via a plurality of networks, the plurality of networks comprising a first network and a second network, the fraud detection method comprising:
- receiving a frame from the first network;
- determining whether to transmit a determination request for the first frame outside the vehicle;
- transmitting the determination request outside the vehicle, in a case where the determining determines to transmit the determination request outside the vehicle;
- transmitting, before obtaining a determination result from outside the vehicle in accordance with the determination request, the first frame to the second network;
- obtaining the determination result from outside the vehicle in accordance with the determination request; and
- outputting presentation information in accordance with the determination result.

\* \* \* \* \*